US008611284B2

(12) United States Patent
Agrawal et al.

(10) Patent No.: US 8,611,284 B2
(45) Date of Patent: *Dec. 17, 2013

(54) USE OF SUPPLEMENTAL ASSIGNMENTS TO DECREMENT RESOURCES

(75) Inventors: Avneesh Agrawal, San Diego, CA (US); Aamod Khandekar, San Diego, CA (US); Alexei Gorokhov, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 704 days.

This patent is subject to a terminal disclaimer.

(21) Appl. No.: 11/370,639

(22) Filed: Mar. 7, 2006

(65) Prior Publication Data

US 2007/0211668 A1 Sep. 13, 2007
US 2011/0255518 A9 Oct. 20, 2011

Related U.S. Application Data

(63) Continuation-in-part of application No. 11/142,121, filed on May 31, 2005.

(51) Int. Cl.
*H04Q 1/00* (2006.01)
(52) U.S. Cl.
USPC .............................. 370/329; 370/310; 370/328
(58) Field of Classification Search
USPC ......... 370/310, 328, 329, 331, 335, 338, 429, 370/468, 352, 321, 401, 412, 413, 477; 455/452.1, 452.2, 451, 453, 403, 557
See application file for complete search history.

(56) References Cited

U.S. PATENT DOCUMENTS

| | | | |
|---|---|---|---|
| 4,393,276 A | 7/1983 | Steele | |
| 4,554,668 A | 11/1985 | Deman et al. | |
| 4,747,137 A | 5/1988 | Matsunaga | |
| 4,783,779 A | 11/1988 | Takahata et al. | |
| 4,783,780 A | 11/1988 | Alexis | |
| 4,975,952 A | 12/1990 | Mabey et al. | |
| 5,008,900 A | 4/1991 | Critchlow et al. | |
| 5,115,248 A | 5/1992 | Roederer | |
| 5,268,694 A | 12/1993 | Jan et al. | |
| 5,282,222 A | 1/1994 | Fattouche et al. | |
| 5,363,408 A | 11/1994 | Paik et al. | |
| 5,371,761 A | 12/1994 | Daffara et al. | |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

International Search Report—PCT/US06/021207 International Search Authority—European Patent Office, Sep. 21, 2006.

(Continued)

*Primary Examiner* — Jean Gelin
(74) *Attorney, Agent, or Firm* — Donald C. Kordich

(57) ABSTRACT

Systems and methodologies are described that facilitate dynamically supplementing or decrementing resource assignments to mobile devices in a wireless network environment without requiring transmission of replacement assignments. Supplemental assignments can be generated based on information related to mobile device need and resource availability. Moreover, resource assignments can be persisted for a mobile device.

32 Claims, 15 Drawing Sheets

(56) References Cited

U.S. PATENT DOCUMENTS

| | | | |
|---|---|---|---|
| 5,384,810 A | 1/1995 | Amrany | |
| 5,406,551 A | 4/1995 | Saito et al. | |
| 5,410,538 A | 4/1995 | Roche et al. | |
| 5,455,839 A | 10/1995 | Eyuboglu | |
| 5,465,253 A | 11/1995 | Rahnema | |
| 5,469,471 A | 11/1995 | Wheatley, III | |
| 5,491,727 A | 2/1996 | Petit | |
| 5,513,379 A | 4/1996 | Benveniste et al. | |
| 5,539,748 A | 7/1996 | Raith | |
| 5,548,582 A | 8/1996 | Brajal et al. | |
| 5,583,869 A | 12/1996 | Grube et al. | |
| 5,594,738 A | 1/1997 | Crisler et al. | |
| 5,604,744 A | 2/1997 | Andersson et al. | |
| 5,612,978 A | 3/1997 | Blanchard et al. | |
| 5,625,876 A | 4/1997 | Gilhousen et al. | |
| 5,684,491 A | 11/1997 | Newman et al. | |
| 5,726,978 A | 3/1998 | Frodigh et al. | |
| 5,732,113 A | 3/1998 | Schmidl et al. | |
| 5,745,487 A | 4/1998 | Hamaki | |
| 5,768,276 A | 6/1998 | Diachina et al. | |
| 5,790,537 A | 8/1998 | Yoon et al. | |
| 5,812,938 A | 9/1998 | Gilhousen et al. | |
| 5,815,488 A | 9/1998 | Williams et al. | |
| 5,822,368 A | 10/1998 | Wang | |
| 5,838,268 A | 11/1998 | Frenkel | |
| 5,867,478 A | 2/1999 | Baum et al. | |
| 5,870,393 A | 2/1999 | Yano et al. | |
| 5,887,023 A | 3/1999 | Mabuchi | |
| 5,907,585 A | 5/1999 | Suzuki et al. | |
| 5,920,571 A | 7/1999 | Houck et al. | |
| 5,926,470 A | 7/1999 | Tiedemann, Jr. | |
| 5,933,421 A | 8/1999 | Alamouti et al. | |
| 5,949,814 A | 9/1999 | Odenwalder et al. | |
| 5,953,325 A | 9/1999 | Willars | |
| 5,955,992 A | 9/1999 | Shattil | |
| 5,956,642 A | 9/1999 | Larsson et al. | |
| 5,995,992 A | 11/1999 | Eckard | |
| 5,999,826 A | 12/1999 | Whinnett | |
| 6,002,942 A | 12/1999 | Park | |
| 6,016,123 A | 1/2000 | Barton et al. | |
| 6,038,263 A | 3/2000 | Kotzin et al. | |
| 6,038,450 A | 3/2000 | Brink et al. | |
| 6,052,364 A | 4/2000 | Chalmers et al. | |
| 6,061,337 A | 5/2000 | Light et al. | |
| 6,067,315 A | 5/2000 | Sandin | |
| 6,075,350 A | 6/2000 | Peng | |
| 6,075,797 A | 6/2000 | Thomas | |
| 6,076,114 A | 6/2000 | Wesley | |
| 6,088,345 A | 7/2000 | Sakoda et al. | |
| 6,108,323 A | 8/2000 | Gray | |
| 6,108,550 A | 8/2000 | Wiorek et al. | |
| 6,112,094 A | 8/2000 | Dent | |
| 6,128,776 A | 10/2000 | Kang | |
| 6,138,037 A | 10/2000 | Jaamies | |
| 6,141,317 A | 10/2000 | Marchok et al. | |
| 6,154,484 A | 11/2000 | Lee et al. | |
| 6,169,910 B1 | 1/2001 | Tamil et al. | |
| 6,175,550 B1 | 1/2001 | van Nee | |
| 6,175,650 B1 | 1/2001 | Sindhu et al. | |
| 6,176,550 B1 | 1/2001 | Lamart et al. | |
| 6,198,775 B1 | 3/2001 | Khayrallah et al. | |
| 6,215,983 B1 | 4/2001 | Dogan et al. | |
| 6,226,280 B1 * | 5/2001 | Roark et al. | 370/330 |
| 6,229,795 B1 | 5/2001 | Pankaj et al. | |
| 6,232,918 B1 | 5/2001 | Wax et al. | |
| 6,240,129 B1 | 5/2001 | Reusens et al. | |
| 6,249,683 B1 | 6/2001 | Lundby et al. | |
| 6,256,478 B1 | 7/2001 | Allen et al. | |
| 6,271,946 B1 | 8/2001 | Chang et al. | |
| 6,272,122 B1 | 8/2001 | Wee | |
| 6,310,704 B1 | 10/2001 | Dogan et al. | |
| 6,317,435 B1 | 11/2001 | Tiedemann, Jr. et al. | |
| 6,335,922 B1 | 1/2002 | Tiedemann, Jr. et al. | |
| 6,337,659 B1 | 1/2002 | Kim | |
| 6,337,983 B1 | 1/2002 | Bonta et al. | |
| 6,353,637 B1 | 3/2002 | Mansour et al. | |
| 6,363,060 B1 | 3/2002 | Sarkar | |
| 6,374,115 B1 | 4/2002 | Barnes et al. | |
| 6,377,539 B1 | 4/2002 | Kang et al. | |
| 6,377,809 B1 | 4/2002 | Rezaiifar et al. | |
| 6,388,998 B1 | 5/2002 | Kasturia | |
| 6,393,008 B1 | 5/2002 | Cheng et al. | |
| 6,393,012 B1 | 5/2002 | Pankaj | |
| 6,393,295 B1 | 5/2002 | Butler et al. | |
| 6,401,062 B1 | 6/2002 | Murashima | |
| 6,438,369 B1 | 8/2002 | Huang et al. | |
| 6,449,246 B1 | 9/2002 | Barton et al. | |
| 6,466,800 B1 | 10/2002 | Sydon et al. | |
| 6,473,467 B1 | 10/2002 | Wallace et al. | |
| 6,477,317 B1 | 11/2002 | Itokawa | |
| 6,478,422 B1 | 11/2002 | Hansen | |
| 6,483,820 B1 | 11/2002 | Davidson et al. | |
| 6,487,243 B1 | 11/2002 | Hwang et al. | |
| 6,496,790 B1 | 12/2002 | Kathavate et al. | |
| 6,501,810 B1 | 12/2002 | Karim et al. | |
| 6,507,601 B2 | 1/2003 | Parsa et al. | |
| 6,519,462 B1 | 2/2003 | Lu et al. | |
| 6,529,525 B1 | 3/2003 | Pecen et al. | |
| 6,535,666 B1 | 3/2003 | Dogan et al. | |
| 6,539,008 B1 | 3/2003 | Ahn et al. | |
| 6,539,213 B1 | 3/2003 | Richards et al. | |
| 6,542,485 B1 | 4/2003 | Mujtaba | |
| 6,542,743 B1 | 4/2003 | Soliman | |
| 6,546,248 B1 | 4/2003 | Jou et al. | |
| 6,563,806 B1 | 5/2003 | Yano et al. | |
| 6,563,881 B1 | 5/2003 | Sakoda et al. | |
| 6,577,739 B1 | 6/2003 | Hurtig et al. | |
| 6,584,140 B1 | 6/2003 | Lee | |
| 6,590,881 B1 | 7/2003 | Wallace et al. | |
| 6,597,746 B1 | 7/2003 | Amrany et al. | |
| 6,601,206 B1 | 7/2003 | Marvasti | |
| 6,614,857 B1 | 9/2003 | Buehrer et al. | |
| 6,625,172 B2 | 9/2003 | Odenwalder et al. | |
| 6,636,568 B2 | 10/2003 | Kadous | |
| 6,654,339 B1 | 11/2003 | Bohnke et al. | |
| 6,654,431 B1 | 11/2003 | Barton et al. | |
| 6,657,949 B1 | 12/2003 | Jones, IV et al. | |
| 6,658,258 B1 | 12/2003 | Chen et al. | |
| 6,662,024 B2 | 12/2003 | Walton et al. | |
| 6,674,787 B1 | 1/2004 | Dick et al. | |
| 6,674,810 B1 | 1/2004 | Cheng | |
| 6,675,012 B2 | 1/2004 | Gray | |
| 6,678,318 B1 | 1/2004 | Lai | |
| 6,690,951 B1 | 2/2004 | Cuffaro et al. | |
| 6,693,952 B1 | 2/2004 | Chuah et al. | |
| 6,694,147 B1 | 2/2004 | Viswanath et al. | |
| 6,701,165 B1 | 3/2004 | Ho et al. | |
| 6,704,571 B1 | 3/2004 | Moon | |
| 6,711,400 B1 | 3/2004 | Aura | |
| 6,717,908 B2 | 4/2004 | Vijayan et al. | |
| 6,721,568 B1 | 4/2004 | Gustavsson et al. | |
| 6,724,719 B1 | 4/2004 | Tong et al. | |
| 6,731,602 B1 | 5/2004 | Watanabe et al. | |
| 6,735,244 B1 | 5/2004 | Hasegawa et al. | |
| 6,744,743 B2 | 6/2004 | Walton et al. | |
| 6,748,220 B1 | 6/2004 | Chow et al. | |
| 6,751,444 B1 | 6/2004 | Meiyappan | |
| 6,751,456 B2 | 6/2004 | Bilgic | |
| 6,754,511 B1 | 6/2004 | Halford et al. | |
| 6,763,009 B1 | 7/2004 | Bedekar et al. | |
| 6,765,969 B1 | 7/2004 | Vook et al. | |
| 6,776,165 B2 | 8/2004 | Jin | |
| 6,776,765 B2 | 8/2004 | Soukup et al. | |
| 6,778,513 B2 | 8/2004 | Kasapi et al. | |
| 6,785,341 B2 | 8/2004 | Walton et al. | |
| 6,798,736 B1 | 9/2004 | Black et al. | |
| 6,799,043 B2 | 9/2004 | Tiedemann, Jr. et al. | |
| 6,802,035 B2 | 10/2004 | Catreux et al. | |
| 6,804,307 B1 | 10/2004 | Popovic | |
| 6,813,284 B2 | 11/2004 | Vayanos et al. | |
| 6,821,535 B2 | 11/2004 | Nurmi et al. | |
| 6,828,293 B1 | 12/2004 | Hazenkamp et al. | |
| 6,829,293 B2 | 12/2004 | Jones et al. | |
| 6,831,943 B1 | 12/2004 | Dabak et al. | |

(56) References Cited

U.S. PATENT DOCUMENTS

| | | |
|---|---|---|
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,907,270 B1 | 6/2005 | Blanz |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,928,062 B2 | 8/2005 | Krishnan et al. |
| 6,934,266 B2 | 8/2005 | Dulin et al. |
| 6,934,275 B1 | 8/2005 | Love et al. |
| 6,934,340 B1 | 8/2005 | Dollard |
| 6,940,842 B2 | 9/2005 | Proctor, Jr. |
| 6,940,845 B2 | 9/2005 | Benveniste |
| 6,940,917 B2 | 9/2005 | Menon et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 * | 12/2005 | Laroia et al. ............... 370/345 |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,027,523 B2 | 4/2006 | Jalali et al. |
| 7,031,742 B2 | 4/2006 | Chen et al. |
| 7,039,356 B2 | 5/2006 | Nguyen |
| 7,039,370 B2 | 5/2006 | Laroia et al. |
| 7,042,857 B2 | 5/2006 | Krishnan et al. |
| 7,047,006 B2 | 5/2006 | Classon et al. |
| 7,047,016 B2 | 5/2006 | Walton et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,876 B2 | 1/2007 | Wei et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,212,564 B2 | 5/2007 | Parizhsky et al. |
| 7,215,979 B2 | 5/2007 | Nakagawa et al. |
| 7,221,680 B2 | 5/2007 | Vijayan et al. |
| 7,230,941 B2 | 6/2007 | Odenwalder et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,302,009 B2 | 11/2007 | Walton et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,346,018 B2 | 3/2008 | Holtzman et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,470 B2 | 7/2008 | Lane et al. |

(56) References Cited

U.S. PATENT DOCUMENTS

| | | | |
|---|---|---|---|
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,241 B2 | 8/2008 | Bao et al. |
| 7,418,246 B2 | 8/2008 | Kim et al. |
| 7,420,939 B2 | 9/2008 | Laroia et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi et al. |
| 7,447,270 B1 | 11/2008 | Hottinen |
| 7,450,548 B2 | 11/2008 | Haustein et al. |
| 7,453,801 B2 | 11/2008 | Taneja et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,477,618 B2 | 1/2009 | Chen et al. |
| 7,483,408 B2 | 1/2009 | Bevan et al. |
| 7,483,719 B2 | 1/2009 | Kim et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,512,412 B2 | 3/2009 | Mese et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,706,350 B2 | 4/2010 | Gorokhov et al. |
| 7,724,777 B2 | 5/2010 | Sutivong et al. |
| 7,813,322 B2 | 10/2010 | Laroia et al. |
| 7,852,746 B2 | 12/2010 | Jalali |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,077,692 B2 | 12/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 8,331,463 B2 | 12/2012 | Jayaraman et al. |
| 8,400,979 B2 | 3/2013 | Smee et al. |
| 8,446,892 B2 | 5/2013 | Ji et al. |
| 8,462,859 B2 | 6/2013 | Sampath et al. |
| 2001/0024427 A1 | 9/2001 | Suzuki |
| 2001/0030948 A1 | 10/2001 | Tiedemann, Jr. |
| 2001/0053140 A1 | 12/2001 | Choi et al. |
| 2001/0055294 A1 | 12/2001 | Motoyoshi |
| 2002/0015405 A1 | 2/2002 | Sepponen et al. |
| 2002/0018157 A1 | 2/2002 | Zhang et al. |
| 2002/0044524 A1 | 4/2002 | Laroia et al. |
| 2002/0061742 A1 | 5/2002 | Lapaille et al. |
| 2002/0077152 A1 | 6/2002 | Johnson et al. |
| 2002/0085521 A1* | 7/2002 | Tripathi et al. ............... 370/335 |
| 2002/0090004 A1 | 7/2002 | Rinchiuso |
| 2002/0090024 A1 | 7/2002 | Tan |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0193146 A1 | 12/2002 | Wallace et al. |
| 2003/0002464 A1 | 1/2003 | Rezaiifar et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0112745 A1 | 6/2003 | Zhuang et al. |
| 2003/0125040 A1 | 7/2003 | Walton et al. |
| 2003/0142648 A1 | 7/2003 | Semper |
| 2003/0147371 A1 | 8/2003 | Choi et al. |
| 2003/0157900 A1 | 8/2003 | Gaal et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0224798 A1 | 12/2003 | Willenegger et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0002364 A1 | 1/2004 | Trikkonen et al. |
| 2004/0015692 A1 | 1/2004 | Green et al. |
| 2004/0017785 A1 | 1/2004 | Zelst |
| 2004/0048609 A1 | 3/2004 | Kosaka |
| 2004/0058687 A1 | 3/2004 | Kim et al. |
| 2004/0066761 A1 | 4/2004 | Giannakis et al. |
| 2004/0072565 A1 | 4/2004 | Nobukiyo et al. |
| 2004/0076185 A1 | 4/2004 | Kim et al. |
| 2004/0077379 A1 | 4/2004 | Smith et al. |
| 2004/0081195 A1 | 4/2004 | El-Maleh et al. |
| 2004/0087325 A1 | 5/2004 | Cheng et al. |
| 2004/0097215 A1 | 5/2004 | Abe et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0179627 A1 | 9/2004 | Ketchum et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |

(56) References Cited

U.S. PATENT DOCUMENTS

| | | |
|---|---|---|
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0030964 A1* | 2/2005 | Tiedemann et al. .......... 370/431 |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0063298 A1 | 3/2005 | Ling et al. |
| 2005/0073976 A1 | 4/2005 | Fujii |
| 2005/0085236 A1 | 4/2005 | Gerlach et al. |
| 2005/0088959 A1 | 4/2005 | Kadous |
| 2005/0111397 A1 | 5/2005 | Attar et al. |
| 2005/0120097 A1 | 6/2005 | Walton et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1* | 7/2005 | Park .......................... 455/450 |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0011550 A1 | 1/2007 | Agrawal et al. |
| 2007/0019596 A1 | 1/2007 | Barriac et al. |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |

(56) References Cited

U.S. PATENT DOCUMENTS

| | | | |
|---|---|---|---|
| 2007/0097981 A1 | 5/2007 | Papasakellariou | |
| 2007/0098050 A1 | 5/2007 | Khandekar et al. | |
| 2007/0098120 A1 | 5/2007 | Wang | |
| 2007/0110172 A1 | 5/2007 | Faulkner et al. | |
| 2007/0115795 A1 | 5/2007 | Gore et al. | |
| 2007/0149194 A1 | 6/2007 | Das et al. | |
| 2007/0149228 A1 | 6/2007 | Das | |
| 2007/0159969 A1 | 7/2007 | Das et al. | |
| 2007/0160115 A1 | 7/2007 | Palanki et al. | |
| 2007/0165738 A1 | 7/2007 | Barriac et al. | |
| 2007/0177631 A1 | 8/2007 | Popovic et al. | |
| 2007/0177681 A1 | 8/2007 | Choi et al. | |
| 2007/0183303 A1 | 8/2007 | Pi et al. | |
| 2007/0183386 A1 | 8/2007 | Muharemovic et al. | |
| 2007/0207812 A1 | 9/2007 | Borran et al. | |
| 2007/0211616 A1 | 9/2007 | Khandekar et al. | |
| 2007/0211667 A1 | 9/2007 | Agrawal et al. | |
| 2007/0230324 A1 | 10/2007 | Li et al. | |
| 2007/0242653 A1* | 10/2007 | Yang et al. | 370/342 |
| 2007/0263743 A1 | 11/2007 | Lee et al. | |
| 2007/0280336 A1 | 12/2007 | Zhang et al. | |
| 2007/0281702 A1 | 12/2007 | Lim et al. | |
| 2008/0039129 A1 | 2/2008 | Li et al. | |
| 2008/0063099 A1 | 3/2008 | Laroia et al. | |
| 2008/0095223 A1 | 4/2008 | Tong et al. | |
| 2008/0095262 A1 | 4/2008 | Ho et al. | |
| 2008/0151829 A1 | 6/2008 | Khandekar et al. | |
| 2008/0181139 A1 | 7/2008 | Rangarajan et al. | |
| 2008/0214222 A1 | 9/2008 | Atarashi et al. | |
| 2008/0253279 A1 | 10/2008 | Ma et al. | |
| 2008/0267157 A1 | 10/2008 | Lee et al. | |
| 2008/0299983 A1 | 12/2008 | Kwak et al. | |
| 2009/0003466 A1 | 1/2009 | Taherzadehboroujeni et al. | |
| 2009/0010351 A1 | 1/2009 | Laroia et al. | |
| 2009/0022098 A1* | 1/2009 | Novak et al. | 370/329 |
| 2009/0041150 A1 | 2/2009 | Tsai et al. | |
| 2009/0110103 A1 | 4/2009 | Maltsev et al. | |
| 2009/0180459 A1 | 7/2009 | Orlik et al. | |
| 2009/0197646 A1 | 8/2009 | Tamura et al. | |
| 2009/0201826 A1 | 8/2009 | Gorokhov et al. | |
| 2009/0201872 A1 | 8/2009 | Gorokhov et al. | |
| 2009/0213750 A1 | 8/2009 | Gorokhov et al. | |
| 2009/0213950 A1 | 8/2009 | Gorokhov et al. | |
| 2009/0262641 A1 | 10/2009 | Laroia et al. | |
| 2009/0262699 A1 | 10/2009 | Wengerter et al. | |
| 2009/0285163 A1* | 11/2009 | Zhang et al. | 370/329 |
| 2009/0287977 A1 | 11/2009 | Chang et al. | |
| 2010/0135242 A1 | 6/2010 | Nam et al. | |
| 2010/0220800 A1 | 9/2010 | Erell et al. | |
| 2010/0232384 A1 | 9/2010 | Farajidana et al. | |
| 2010/0238902 A1 | 9/2010 | Ji et al. | |
| 2010/0254263 A1 | 10/2010 | Chen et al. | |
| 2011/0064070 A1 | 3/2011 | Gore et al. | |
| 2011/0306291 A1 | 12/2011 | Ma et al. | |
| 2012/0002623 A1 | 1/2012 | Khandekar et al. | |
| 2012/0063441 A1 | 3/2012 | Palanki | |
| 2012/0120925 A1 | 5/2012 | Kadous et al. | |
| 2012/0140798 A1 | 6/2012 | Kadous et al. | |
| 2012/0140838 A1 | 6/2012 | Kadous et al. | |
| 2013/0016678 A1 | 1/2013 | Laroia et al. | |

FOREIGN PATENT DOCUMENTS

| | | | |
|---|---|---|---|
| CA | 2540688 | | 5/2005 |
| CA | 2577369 | | 3/2006 |
| CL | 19931400 | | 12/1994 |
| CL | 8461997 | | 1/1998 |
| CL | 22892004 | | 9/2005 |
| CL | 30862004 | | 10/2005 |
| CL | 14922006 | | 4/2007 |
| CL | 14892006 | | 5/2007 |
| CL | 14902006 | | 5/2007 |
| CL | 29062006 | | 5/2007 |
| CN | 1252919 | | 5/2000 |
| CN | 1284795 | | 2/2001 |
| CN | 1296682 | | 5/2001 |
| CN | 1344451 | A | 4/2002 |
| CN | 1346221 | | 4/2002 |
| CN | 1383631 | | 12/2002 |
| CN | 1386344 | | 12/2002 |
| CN | 1402916 | A | 3/2003 |
| CN | 1424835 | | 6/2003 |
| CN | 1132474 | C | 12/2003 |
| CN | 1467938 | A | 1/2004 |
| CN | 1487755 | A | 4/2004 |
| CN | 1520220 | | 8/2004 |
| CN | 1525678 | | 9/2004 |
| CN | 1642051 | A | 7/2005 |
| CN | 1647436 | | 7/2005 |
| DE | 19800953 | C1 | 7/1999 |
| DE | 19957288 | C1 | 5/2001 |
| DE | 10240138 | | 8/2003 |
| DE | 10254384 | | 6/2004 |
| EP | 0488976 | | 6/1992 |
| EP | 0568291 | A2 | 11/1993 |
| EP | 0786889 | A1 | 7/1997 |
| EP | 0805576 | A2 | 11/1997 |
| EP | 0807989 | A1 | 11/1997 |
| EP | 0844796 | A2 | 5/1998 |
| EP | 0981222 | A2 | 2/2000 |
| EP | 1001570 | A2 | 5/2000 |
| EP | 1047209 | A1 | 10/2000 |
| EP | 1061687 | A1 | 12/2000 |
| EP | 1091516 | A1 | 4/2001 |
| EP | 1093241 | A1 | 4/2001 |
| EP | 1180907 | A2 | 2/2002 |
| EP | 1187506 | A1 | 3/2002 |
| EP | 1204217 | A1 | 5/2002 |
| EP | 1255369 | | 11/2002 |
| EP | 1267513 | | 12/2002 |
| EP | 1286490 | A2 | 2/2003 |
| EP | 1335504 | A2 | 8/2003 |
| EP | 1376920 | A1 | 1/2004 |
| EP | 1392073 | A1 | 2/2004 |
| EP | 1434365 | A2 | 6/2004 |
| EP | 1441469 | A2 | 7/2004 |
| EP | 1445873 | A2 | 8/2004 |
| EP | 1465449 | A1 | 10/2004 |
| EP | 1478204 | A2 | 11/2004 |
| EP | 1507421 | A1 | 2/2005 |
| EP | 1513356 | A2 | 3/2005 |
| EP | 1531575 | A2 | 5/2005 |
| EP | 1533950 | A1 | 5/2005 |
| EP | 1542488 | A1 | 6/2005 |
| EP | 1601149 | A2 | 11/2005 |
| EP | 1643669 | A1 | 4/2006 |
| EP | 1538863 | A1 | 6/2006 |
| EP | 1898542 | A1 | 3/2008 |
| FR | 2584884 | | 1/1987 |
| GB | 2279540 | A | 1/1995 |
| GB | 2348776 | A | 10/2000 |
| GB | 2412541 | | 9/2005 |
| IL | 201872 | | 5/2012 |
| JP | 4301931 | A | 10/1992 |
| JP | 7336323 | A | 12/1995 |
| JP | 8116329 | A | 5/1996 |
| JP | 08288927 | | 11/1996 |
| JP | 9008725 | A | 1/1997 |
| JP | H09501548 | A | 2/1997 |
| JP | 9131342 | | 5/1997 |
| JP | 9182148 | A | 7/1997 |
| JP | 09214404 | | 8/1997 |
| JP | 9284200 | A | 10/1997 |
| JP | 10117162 | | 5/1998 |
| JP | H10210000 | A | 8/1998 |
| JP | 10322304 | | 12/1998 |
| JP | 11191756 | A | 7/1999 |
| JP | 11196109 | | 7/1999 |
| JP | 11508417 | T | 7/1999 |
| JP | 11239155 | A | 8/1999 |
| JP | 11298954 | | 10/1999 |
| JP | 11331927 | A | 11/1999 |
| JP | 2000102065 | A | 4/2000 |

(56) References Cited

FOREIGN PATENT DOCUMENTS

| | | |
|---|---|---|
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 A | 2/2004 |
| JP | 200472457 | 3/2004 |
| JP | 2004072157 A | 3/2004 |
| JP | 2004096142 | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 A | 9/2004 |
| JP | 2004297276 A | 10/2004 |
| JP | 2004297756 | 10/2004 |
| JP | 2005006337 | 1/2005 |
| JP | 2005020530 | 1/2005 |
| JP | 2005502218 A | 1/2005 |
| JP | 2005506757 A | 3/2005 |
| JP | 2005130491 A | 5/2005 |
| JP | 2005197772 | 7/2005 |
| JP | 2005203961 | 7/2005 |
| JP | 2005521327 | 7/2005 |
| JP | 2005521358 | 7/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2007500486 A | 1/2007 |
| JP | 2007519281 | 7/2007 |
| JP | 2007527127 | 9/2007 |
| JP | 2008505587 A | 2/2008 |
| JP | 2008535398 | 8/2008 |
| JP | 4188372 B2 | 11/2008 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2192094 | 10/2002 |
| RU | 2197778 C2 | 1/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2242091 C2 | 12/2004 |
| RU | 2003117017 | 12/2004 |
| RU | 2250564 | 4/2005 |
| RU | 2267224 | 12/2005 |
| RU | 2335864 C2 | 10/2008 |
| RU | 2349043 C2 | 3/2009 |
| SU | 1320883 | 6/1987 |
| TW | 510132 | 11/2002 |
| TW | 200401572 | 1/2004 |
| TW | I232040 | 5/2005 |
| TW | 248266 | 1/2006 |
| TW | 200718128 | 5/2007 |
| WO | 9408432 | 4/1994 |
| WO | 9613920 A1 | 5/1996 |
| WO | 9701256 | 1/1997 |
| WO | 9737456 A2 | 10/1997 |
| WO | 9746033 A2 | 12/1997 |
| WO | 9800946 A2 | 1/1998 |
| WO | 9814026 | 4/1998 |
| WO | 9837706 | 8/1998 |
| WO | WO 98/48581 | 10/1998 |
| WO | 9853561 | 11/1998 |
| WO | 9941871 A1 | 8/1999 |
| WO | 9944313 | 9/1999 |
| WO | 9944383 A1 | 9/1999 |
| WO | 9952250 A1 | 10/1999 |
| WO | 9953713 | 10/1999 |
| WO | 9959265 | 11/1999 |
| WO | 9960729 A1 | 11/1999 |
| WO | 0002397 | 1/2000 |
| WO | 0033503 | 6/2000 |
| WO | 0070897 | 11/2000 |
| WO | 0126269 A1 | 4/2001 |
| WO | 0139523 A2 | 5/2001 |
| WO | 0145300 | 6/2001 |
| WO | 0148969 A2 | 7/2001 |
| WO | 0158054 A1 | 8/2001 |
| WO | 0169814 A1 | 9/2001 |
| WO | 0182543 | 11/2001 |
| WO | 0182544 A2 | 11/2001 |
| WO | 0189112 A1 | 11/2001 |
| WO | 0193505 | 12/2001 |
| WO | 0204936 A1 | 1/2002 |
| WO | 0207375 | 1/2002 |
| WO | 0215616 | 2/2002 |
| WO | 0219746 A1 | 3/2002 |
| WO | 0231991 | 4/2002 |
| WO | 0233848 A2 | 4/2002 |
| WO | 0249305 A2 | 6/2002 |
| WO | 0249306 A2 | 6/2002 |
| WO | 0249385 A2 | 6/2002 |
| WO | WO 02/45456 | 6/2002 |
| WO | 02082689 A2 | 10/2002 |
| WO | 02082743 A2 | 10/2002 |
| WO | 02100027 A1 | 12/2002 |
| WO | 03003617 | 1/2003 |
| WO | 03019819 A1 | 3/2003 |
| WO | 03030414 | 4/2003 |

(56) References Cited

FOREIGN PATENT DOCUMENTS

| | | |
|---|---|---|
| WO | 03034644 A1 | 4/2003 |
| WO | 03043262 | 5/2003 |
| WO | 03043369 | 5/2003 |
| WO | 03069832 A1 | 8/2003 |
| WO | 03085876 | 10/2003 |
| WO | 03088538 A1 | 10/2003 |
| WO | 2004002011 A1 | 12/2003 |
| WO | 2004004370 | 1/2004 |
| WO | 2004008671 | 1/2004 |
| WO | 2004008681 A1 | 1/2004 |
| WO | 2004016007 | 2/2004 |
| WO | 2004023834 | 3/2004 |
| WO | 2004030238 A1 | 4/2004 |
| WO | 2004032443 A1 | 4/2004 |
| WO | 2004038972 A1 | 5/2004 |
| WO | 2004040690 A2 | 5/2004 |
| WO | 2004047354 | 6/2004 |
| WO | 2004049618 A1 | 6/2004 |
| WO | 2004051872 A2 | 6/2004 |
| WO | 2004062255 | 7/2004 |
| WO | 2004068721 A2 | 8/2004 |
| WO | 2004073276 | 8/2004 |
| WO | 2004075442 | 9/2004 |
| WO | WO2004077850 | 9/2004 |
| WO | 2004086706 A1 | 10/2004 |
| WO | 2004086711 | 10/2004 |
| WO | 2004095730 A1 | 11/2004 |
| WO | 2004095854 | 11/2004 |
| WO | 2004098072 A2 | 11/2004 |
| WO | 2004098222 | 11/2004 |
| WO | 2004105272 A1 | 12/2004 |
| WO | 2004114549 | 12/2004 |
| WO | 2004114564 A1 | 12/2004 |
| WO | 2005002253 A1 | 1/2005 |
| WO | 2005011163 A1 | 2/2005 |
| WO | 2005015795 A1 | 2/2005 |
| WO | 2005015797 | 2/2005 |
| WO | 2005015810 | 2/2005 |
| WO | 2005020488 A1 | 3/2005 |
| WO | WO2005025110 A2 | 3/2005 |
| WO | 2005032004 A1 | 4/2005 |
| WO | 2005046080 | 5/2005 |
| WO | 2005055484 A1 | 6/2005 |
| WO | 2005065062 A2 | 7/2005 |
| WO | 2005069538 A1 | 7/2005 |
| WO | 2006007292 A2 | 1/2006 |
| WO | 2006077696 | 7/2006 |
| WO | 2006134032 | 12/2006 |

OTHER PUBLICATIONS

Written Opinion—PCT/US06/021207 International Search Authority—European Patent Office, Sep. 21, 2006.
International Preliminary Report on Patentability—PCT/US06/021207—The International Bureau of WIPO, Geneva, Switzerland, Dec. 6, 2007.
European Search Report—EP10010903, Search Authority—Berlin Patent Office, Oct. 26, 2010.
Translation of Office Action in Japan application 2008-510335 corresponding to U.S. Appl. No. 11/142,121, citing JP2001521698, JP11191756 and JP2001156732 dated Feb. 8, 2011.
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25814 v031 (Nov. 2005), pp. 1-57.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route des Lucioles; F-06921 Sophia-Antipolis Cedex; France, vol. RAN WG1, No. St. Julian; Apr. 3, 2007, XP050105640 [retrieved on Apr. 3, 2007].
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Bahai, Saltzberg: "System Architecture," Multi-Carrier Digital Communications, Kluwer Academic, New York, NY, XP-002199501, 1999, pp. 17-21.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Bhushan N., "UHDR Overview", C30-20060522-037, Denver, CO, May 22, 2006, pp. 1-115.
Bingham: "Other Types of MCM," ADSL, VDSL, and Multicarrier Modulation, John Wiley & Sons, New York, XP-002199502. 2000, pp. 111-113.
Blum, R. et al., "On Optimum MIMO with Antenna Selection," IEEE International Conference on Communications: Conference Proceedings, vol. 1, Apr. 28, 2002, pp. 386-390.
Catreux, S. et al., "Simulation results for an interference-limited multiple input multiple output cellular system," Global Telecommunications Conference, 2000. Globecom '00. IEEE. Dec. 1, 2000. vol. 2, pp. 1094-1096, http://ieeexplore.ieee.org/iel5/7153/19260/00891306.pdf"tp=&isnumber=19260&arnumber=8913063&punumber=7153.
Chennakeshu, et al. "Capacity Analysis of a TDMA-Based Slow-Frequency-Hopped Cellular System," IEEE Transaction on Vehicular Technology, vol. 45., No. 3, Aug. 1, 1996, pp. 531-542, XP000612951.
Chiani, et al., "Outage Evaluation for Slow Frequency-Hopping Mobile Radio Systems" IEEE Transactions on Communications, vol. 47, No. 12 Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), pp. 3661-3665.
Chung, S. et al., "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Das, Arnab, et al. "Adaptive, asynchronous incremental redundancy (A-IR) with fixed transmission time intervals TTI for HSPDA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004. Globecom '4, IEEE, vol. 5 IEEE Nov. 29-Dec. 3, 2004, pp. 3068-3072.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1, 2, 91-93.
Dinis, R. et al.: "A Multiple Access Scheme for the Uplink of Broadband Wireless Systems," Global Telecommunications Conference, 2004. Globecom '04. IEEE Dallas, TX, USA Nov. 29-Dec. 3, 2004, vol. 6, pp. 3808-3812, XP010758449 Piscataway, NJ, USA, IEEE.

(56) References Cited

OTHER PUBLICATIONS

Don Torrieri, "Cellular Frequency-Hopping CDMA Systems," IEEE Vehicular Technology Conference, May 16, 1999, pp. 919-925, vol. 2.
El Gamal, H. et al., "Universal Space-Time Coding," IEEE Transactions on Information Theory, vol. 49, Issue 5, pp. 1097-1119, XP011074756, ISSN: 0018-9448, May 2003.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23 (2005).
Groe, J., et al., "CDMA Mobile Radio Design," Sep. 26, 2001, Artech House, Inc. Norwood, MA, pp. 257-259.
Guo, K. et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
"Introduction to cdma2000 Standards for Spread Spectrum Systems", TIA/EIA/IS-2000 Standards for CDMA2000 Spread Spectrum Systems 3GPP2 C.S0001-0 Version 1.0, Jul. 1999, 16 pages.
Jim Tomcik, "MBFDD and MBTDD Wideband Mode: Technology Overview", IEEE C802.20-05/68r1, Jan. 6, 2006.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
John B. Groe, Lawrence E. Larson, "CDMA Mobile Radio Design" Sep. 26, 2001, Artech House, Norwood, MA02062 580530, XP002397967, pp. 157-159.
J.S. Chow and J.M. Cioffi: "A cost-effective maximum likelihood reciever for multicarrier systems", Proc. IEEE Int. Conf. On Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-Bit Differentially Detected GMSK Over Rayleigh Fading Channel," IEEE Vehicular Technology Conference, Apr. 28, 1996, pp. 789-794.
Kishiyama et al., Investigation of optimum pilot channel structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, November 2001, pp. 2254-2266.
Kousa, M. et al., "Adaptive Binary Coding for Diversity Communication Systems" IEEE International Conference on Personal Wireless Communications Proceedings, pp. 80-84, XP000992269, (1997).
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Molisch, et al., MIMO systems with antenna selection, IEEE Microwave Magazine, Mar. 2004, pp. 46-56, XP002411128.
Naofal Al-Dhahir: "A Bandwidth-Optimized Reduced-Complexity Equalized Multicarrier Transceiver", IEEE Transactions on Communications, vol. 45, No. 8, Aug. 1997, pp. 1-17.
Naofal Al-Dhahir: "Optimum Finite-Length Equalization for Multicarrier Transceivers", IEEE Trans. On Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Natarajan, et al., "High-Performance MC-CDMA via Carrier Interferometry Codes," IEEE Transactions on Vehicular Technology, 2001, vol. 50 (issue 6) pp. 1344-1353.
NOKIA: "Compact signalling of multi-code allocation for HSDPA", version 2, 3GPP R1-2-0018, Jan. 11, 2002.

(56) References Cited

OTHER PUBLICATIONS

Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-9.
NTT DoCoMo, et al., "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Prasad, N. et al., "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. Ran WG1, No. San Diego, USA; Oct. 4, 2005, pp. 1-10, XP050100715.
Rohling, H et al., "Performance Comparison Of Different Multiple Access Schemes For the Downlink of an OFDM Communication System", Vehicular Technology Conference, 1997, 47th IEEE, vol. 3, May 3-7, 1997, pp. 1365-1369.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Samsung: "Uplink Transmission and Multiplexing for EUTRA", 3GPP DRAFT; R1-050605 UL Multiplexing, Jun. 16, 2005, XP050111420.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM '93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell, et al., "Application of IFDMA to Mobile Radio Transmission", IEEE 1998 International Conference on Universal Personal Communications, vol. 2, Oct. 5-9, 1998, pp. 1267-1272.
Schnell, M. et al., "A Promising New Wideband Multiple-Access Scheme For Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Shattil et al., "Array Control Systems for Multicarrier Protocols Using a Frequency-Shifted Feedback Cavity", Radio and Wireless Conference EEE, Aug. 1-4, 1999, pp. 215-218.
Siemens, "Evolved Utra uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.
Sorger U., et al., "Interleaved FDMA—a new spread-spectrum multiple-access scheme" Communications, 1998. ICC 98. Conference Record. 1998 IEEE Internation AL Conference on Atlanta, GA, USA Jun. 7-11, 1998, New York, NY, USA, IEEE, US, vol. 2, Jun. 7, 1998, pp. 1013-1017, XP010284733 ISBN: 978-0-7803-4788-5.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Tachikawa (Editor); "W-CDMA Mobile Communication Systems," John Wiley & Sons Ltd., Japan, Maruzen: pp. 82-213, Jun. 25, 2001.
Taiwan Search Report—TW095108014—TIPO—Mar. 8, 2012.
Telecommunications Industry Association, Mobile Station-Base Station Compatibility Standard for Dual-Mode Wideband Spread Spectrum Cellular System, TIA/EIA-95, Jul. 1993, 668 pages.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik T., "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Toufik, I., et al., Channel allocation algorithms for multi-carrier systems, Vehicular Technology Conference 2004, VTC2004-Fall, 2004 IEEE 60th Los Angeles, CA, USA Sep. 26-29, 2004, Piscataway, NJ, USA IEEE, Sep. 26, 2004, pp. 1129-1133, XP010786798.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Voltz, P. J., "Characterization of the optimum transmitter correlation matrix for MIMO with antenna subset selection", IEEE Transactions on Communications, vol. 51, No. 11, pp. 1779-1782, (Nov. 1, 2003).
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Widdup, B. et al., "A highly-parallel VLSI architecture for a list sphere detector," IEEE International Conference, Paris, France, vol. 5, pp. 2720-2725 (2004).
Wiesel, A., et al., "Efficient implementation of sphere demodulation" Signal Processing Advances in Wireless Communications, 2003. SPAWC 200 3. 4TH IEEE Workshop on Rome. Italy Jun. 15-18, 2003, Piscataway, NJ, USA, IEEE, US, Jun. 15, 2003, pp. 36-40, XP010713463.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Yun et al., "Performance Of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Zekri, et al., "DMT Signals with Low Peak-to-Average Power Ratio," Proceedings, IEEE International Symposium on Computers and Communications, 1999, Jul. 6-8, 1999, pp. 362-368.

* cited by examiner

| | |
|:---:|:---:|
| 1 | 1-5 |
| 2 | 2, 3, 7-20 |
| 3 | 6-8, 17 |
| ... | |
| M | 16 |

USE OF SUPPLEMENTAL ASSIGNMENTS TO DECREMENT RESOURCES

CLAIM OF PRIORITY UNDER 35 U.S.C. §120

The present Application for Patent is a Continuation in Part and claims priority to U.S. patent application Ser. No. 11/142,121 entitled "USE OF SUPPLEMENTAL ASSIGNMENTS" filed May 31, 2005, pending, which is hereby expressly incorporated by reference herein.

BACKGROUND

I. Field

The following description relates generally to wireless communications and more particularly to dynamically managing network resources by providing supplemental resource assignments that facilitate decrementing resources.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

For example, it can be expensive (e.g., bit-wise, . . . ) to precisely describe channel assignments in a wireless networking environment. Such can be especially true when users (e.g., mobile devices) are not required to be aware of system resource assignments to other users of the wireless system. In such cases, assignments of system resources, such as broadcast channels an the like can require updating on virtually every broadcast cycle in order to provide each user with adequate bandwidth and/or networking power, which can tax the wireless network system and expedite realization of network limitations. Additionally, by requiring such continuous updates and/or complete reassignment messages to be transmitted to users so frequently, such conventional methods of system resource allocation can require expensive and high-powered communication components (e.g., transceivers, processors, . . . ) just to meet system demand.

Multiple-access communication systems typically employ methods of assigning system resources to the individual users of the system. When such assignments change rapidly over time, system overhead required just to manage the assignments can become a significant portion of the overall system capacity. When assignments are sent using messages that constrain the assignment of resource blocks to a subset of the total possible permutations of blocks, assignment expense can be reduced somewhat, but by definition, assignments are constrained. Further, in a system where assignments are "sticky" (e.g., an assignment persists over time rather than having a deterministic expiration time), it can be difficult to formulate a constrained assignment message that addresses an instantaneous available resources.

In view of at least the above, there exists a need in the art for a system and/or methodology of improving assignment notification and/or updates and reducing assignment message overhead in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of dynamically allocating system resources comprises determining whether at least one mobile device requires additional resources or requires resource de-allocation, generating a supplemental assignment that de-assigns the resources and is indicated as a supplemental assignment message, and transmitting the supplemental assignment to the at least one mobile device.

In another aspect, a system that facilitates supplementing resource assignments for mobile devices comprises a supplemental component that receives information related to increased or decreased resource requirements of at least one of a plurality of mobile devices and generates a supplemental assignment to allocate additional resources or de-allocate existing resources to satisfy the resource requirements. The system further comprises a transceiver that transmits supplemental assignment messages to the plurality of mobile devices.

In a further aspect, an apparatus comprises means for determining whether at least one mobile device requires additional resources or requires resource de-allocation, means for generating a supplemental assignment that de-assigns the resources and is indicated as a supplemental assignment message, and a transmitter that transmits the supplemental assignment to the at least one mobile device.

In other aspects, a mobile device comprises a processor and a memory coupled to the processor. The processor may be configured to identify whether an assignment message is a supplemental assignment and to determine whether the supplemental assignment is intended to de-assign resources.

In further other aspects, a method comprises determining whether a received assignment message is a supplemental assignment and if the assignment message is a supplemental assignment, then determining whether the supplemental assignment is intended to de-assign resources. The method also comprises de-assigning resources based upon resources identified in the assignment message, if the assignment message is a supplemental assignment.

In yet further aspects, an apparatus comprises means for determining whether a received assignment message is a supplemental assignment and if the assignment message is a supplemental assignment, then determining whether the supplemental assignment is intended to de-assign resources. The apparatus also comprises means for de-assigning resources based upon resources identified in the assignment message, if the assignment message is a supplemental assignment.

To the accomplishment of the foregoing and related ends, the one or more embodiments comprises the features hereinafter fully described and particularly pointed out in the claims. The following description and the annexed drawings set forth in detail certain illustrative aspects of the one or more embodiments. These aspects are indicative, however, of but a few of the various ways in which the principles of various

DETAILED DESCRIPTION

Figure 1:
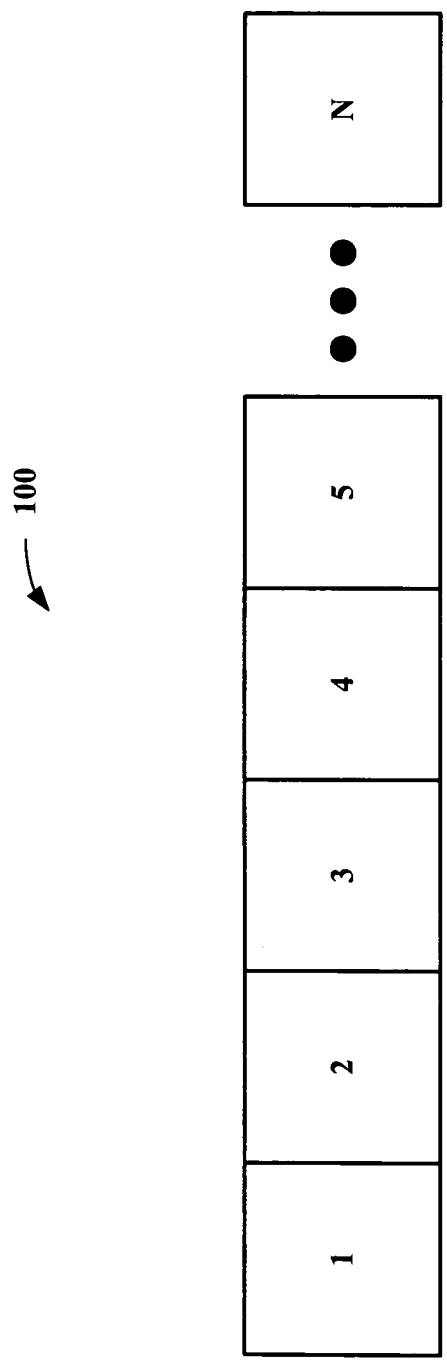
FIG. 1 illustrates a group of N system resource blocks in order to facilitate understanding of a manner in which various embodiments presented herein can operate.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a group of N system resource blocks 100 in order to facilitate understanding of a manner in which various embodiments presented herein can operate. Such resource blocks 100 can be, for instance, time slots, frequencies, code slots, a combination of the preceding, etc. A general description of a subset of such blocks can be, for example, a block index list, such as a list of blocks assigned to a particular user. For example, an index list such as {2, 3, 10, 11, 12, 13} could be employed to represent that the user is assigned such blocks. Alternatively, a Boolean array can be employed to describe the same assignment, such as an array of N bits {01100000011110}. Conventional systems employing such assignment mechanisms will realize significant expense in doing so, albeit with different properties. For instance, a block index list can be substantially more expensive with regard to a number of bits required to convey such assignments as a subset of blocks to be assigned grows in size. The Boolean array, on the other hand, exhibits a somewhat fixed expense regardless of the number of 1s and 0s, but the expense is relatively large, especially as N grows.

Additionally, in cases where assignments are restricted to contiguous sets of blocks, or resources, such assignments can be signaled by indicating a first block in the assignment and a total number of blocks in the assignment. For example, a block index assignment such as {11, 12, 13, 14, 15} can be signaled as {11, 5}, where "11" represents a first block to be assigned to a given user and "5" represents the total number of contiguous blocks to be assigned, of which 11 is the first block. Still furthermore, if an ordering of users is known, then an assignment signal can be transmitted without user information. For instance, only the number of blocks being assigned need be signaled so long as all users are aware of the assignments for all other users. For instance, if assignments for users 1-3 are represented by {user 1: 1-5 }, {user 2: 6-7}, and {user 3: 8-12}, and if all users are aware of their respective user numbers, such an assignment can be written as {5, 2, 5}. However, this arrangement requires that all users on the system are aware of the assignments to all other users since, for example, user 2 cannot know that its assignment begins with block 6 unless it knows that user 1 has been assigned blocks 1-5. Thus, it can be seen that systems employing such conventional methods of assigning system resources can be expensive to implement and can incur a substantial burden on system transmission resources in which they are implemented. As will be seen the systems and methods described herein facilitate surmounting such conventional burdens.

Figure 2:
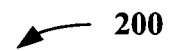
FIG. 2 is an illustration of a channel table that can be employed in a wireless networking system to facilitate assigning system resources that comprises a plurality of users (e.g., devices) and their respective resource assignments.

FIG. 2 is an illustration of a channel table 200 that can be employed in a wireless networking system to facilitate assigning system resources (e.g., transmission channels, time slots, code slots, frequencies, . . . ), which comprises a plurality of users (e.g., devices) and their respective resource assignments. Such a table 200 can be known to all users, which can employ the channel table indices to interpret assignment messages. For example, according the table 200, an assignment such as {user 1: index 2} can be written, which can reduce assignment signal expense when compared to block index and/or Boolean array techniques. The following table sets forth a summary of conventional assignment mechanism characteristics with their relative benefits and consequences.

| Method | Restrictive | Expense | All users must view all assignments |
|---|---|---|---|
| Block index list | No | High | No |
| Contiguous block | Yes | Medium | No |
| Boolean array | No | High | No |
| Known user order | Yes | Low | Yes |
| Channel table | Yes | Medium | No |

Thus, it can be seen that typical assignment allocation schemes do not provide a mechanism that is both cheap and non-restrictive and which does not require all users on a system to view all user assignments.

Figure 3:
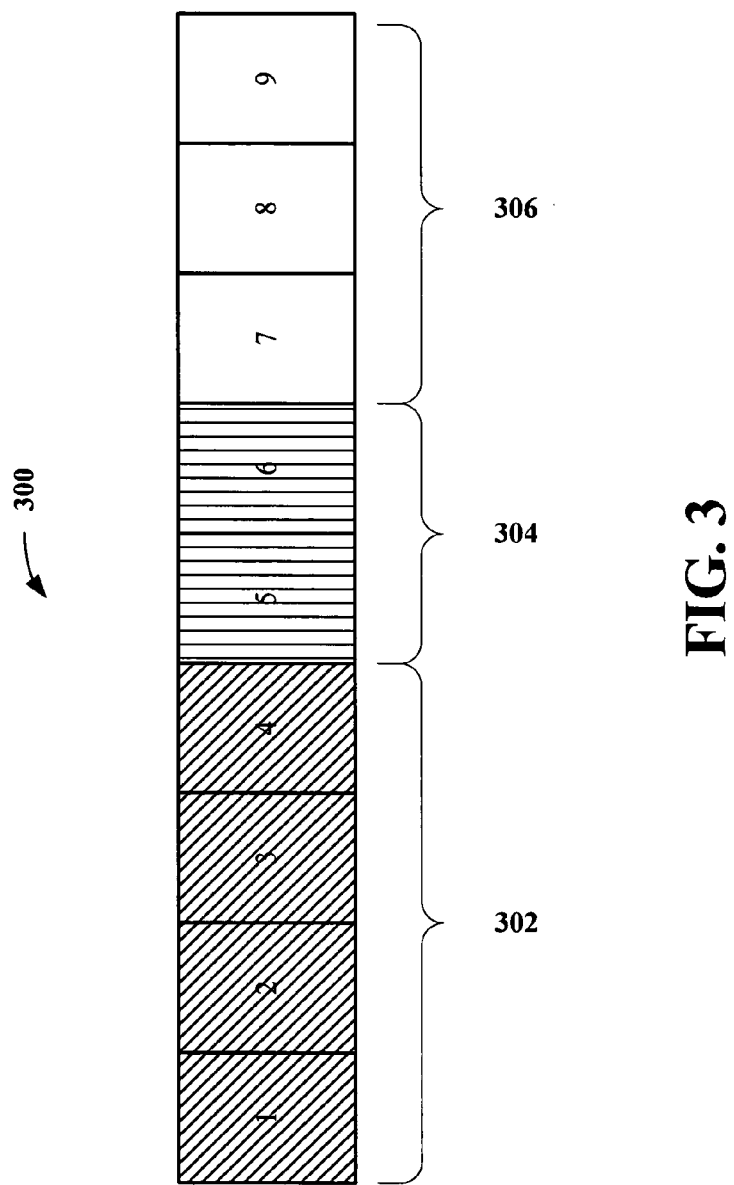
FIG. 3 illustrates a group of resource blocks that can be allocated to a plurality of users.

FIG. 3 illustrates a group of resource blocks 300 that can be allocated to a plurality of users. Such resources can include, for example, system channels, time slots, frequencies, code slots, and the like. According to an embodiment, sticky assignments (e.g., assignments that are valid until a further assignment signal is received) can be employed to assign system resources in, for example, wireless communication networks (e.g., OFDM, OFDMA, CDMA, TDMA, GSM, . . . ). Such assignments can also be restrictive, such that signal expense is reduced at a cost of limiting ability to arbitrarily assign sets of resource blocks. In order to overcome such restrictions while minimizing allocation signal expense, supplemental assignments can be employed to manage system resources and meet user resource needs. For example, the resource blocks 300 can comprise a first block set 302 that contains blocks 1-4 that are assigned to user 1. User 2 can be assigned a second block set 304 that comprises blocks 5 and 6. Finally, blocks 7-9 can comprise a block set 306 that consists of unused blocks. It can be determined that the requirements of user 1 have increased to a point that user 1 requires additional resource blocks. According to this aspect, a supplemental assignment can be generated that can augment user 1's current assignment rather than completely replacing it. For example, a designating bit can be incorporated into the supplemental assignment to tag the assignment as a supplemental assignment so that a recipient device can recognize it as such. If the designator bit is set to "supplemental," then a channel or resource described by the message can be added to the previously held assignment of the user. If the designator bit is not set to "supplemental," then the message can be construed to replace the previous assignment. It will be appreciated by one skilled in the art that other methods of message designation with regard to supplemental/non-supplemental assignments can be employed, and that embodiments described herein are not limited to employing a designator bit, but rather can utilize any suitable designation mechanism, whether implicit or explicit.

For example, user 1's initial sticky assignment can be represented as {1, 2, 3, 4: 0}, where "0" indicates a non-supplemental assignment and channels 1-4 are assigned. Additionally, to mitigate signal transmission expense in cases where assigned channels are contiguous, such a non-supplemental assignment can be represented as [1,4: 0] where the first integer "1" represents a first assigned channel, and the second integer "4" represents a length of assigned channels. If supplemental channels are to be assigned to user 1 for instance due to increased user needs and the like, then a supplemental assignment can be generated and transmitted to user 1. For example, {7, 8, 9: 1} can represent that channels 7, 8, and 9 are additionally to be assigned to user 1. In this example, the designator bit is set to "1" to indicate that the assignment is supplemental and should not merely replace the previous user 1 assignment of channels 1-4, but rather augment such assignment. Additionally, because the additional channels 7-9 are contiguous, the supplemental assignment can be expressed as [7, 3: 1], where 7 is the first supplemental channel assignment, and the length of contiguous supplemental channels to be assigned is 3. According to this latter aspect, assignment signal overhead can be further reduced when compared to conventional systems (e.g., having to transmit a bulky second signal such as {1, 2, 3, 4, 7, 8, 9: 0}).

In other aspects, a supplemental assignment may function as decremental assignment, one that reduces assigned resources, this may be done by transmitting an assignment with the supplemental flag set but that identifies an existing resource or resources already assigned to the user. That way, the user will receive the supplemental assignment, and reduce its resources. This approach allows for the use of a same format message for supplemental assignments that increase and decrease resource allocation. This saves on the overhead of new assignments, while at the same time not requiring implicit de-assignment processing by a user.

For example, a user receives an initial sticky assignment that can be represented as {1, 2, 3, 4: 0}, where "0" indicates a non-supplemental assignment and channels 1-4 are assigned. Then user 1 receives a supplemental assignment, for example, {3: 1} can represent that channel 3 and 4 are being maintained as assigned to user 1, and the other channels 1 and 2, and are being removed from user 1. In this example, the designator bit is set to "1" to indicate that the assignment is supplemental and should not merely replace the previous user 1 assignment of channels 1-4. Alternatively, the supplemental assignment {3: 1} can represent that channels 1-3 are being maintained for user 1 while channel 4 is being removed.

According to a related aspect, supplemental assignment transmission permissions can be predicated upon validation of a previous assignment to a user (e.g., reception of some validating data, such as a verification message indicating successful packet or sequence decode over a reverse link, an acknowledgement of successful receipt or decode over a forward link, . . . ). In such a manner, a network can validate a user's assignment prior to supplementing such assignment.

Figure 4:
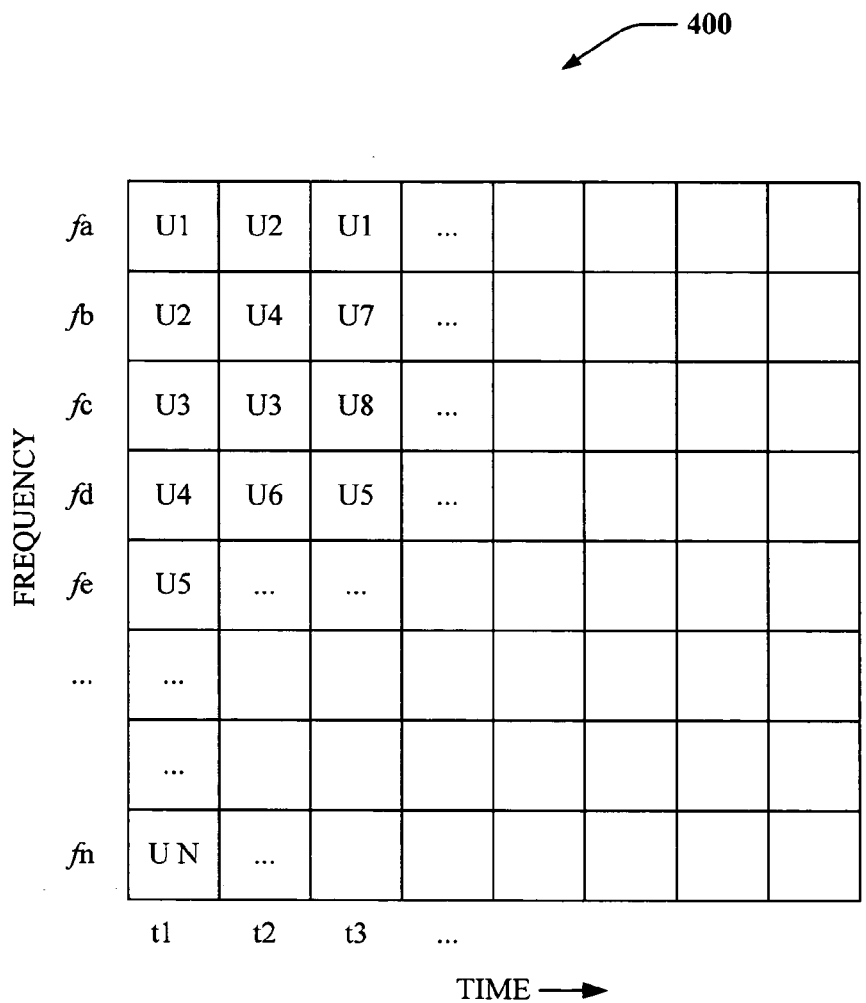
FIG. 4 is an illustration of a series of non-persistent (e.g., non-sticky) assignments made over time.

FIG. 4 is an illustration of a series of non-persistent (e.g., non-sticky) assignments made over time 400. Frequencies are illustrated as the type of system resource being assigned, although assignable system resources are not limited to being such. According to the Figure, a first user, U1, is assigned frequency fa at time 1. At time 2, frequency fa can be reassigned to user 2, in part because the initial assignment is not a sticky assignment. Frequency fc is illustrated as being assigned to user 3 during both time 1 and time 2. However, because the assignment of frequency fc to user 3 is not a sticky assignment, user 3's retention of frequency fc can require separate assignments at each of time 1 and time 2, resulting in undesirable increases in assignment signal overhead, which in turn can detrimentally affect system resources. Thus, a system employing non-sticky assignments would require n different assignment messages per time frame to assign n available frequencies to N users.

Figure 5:
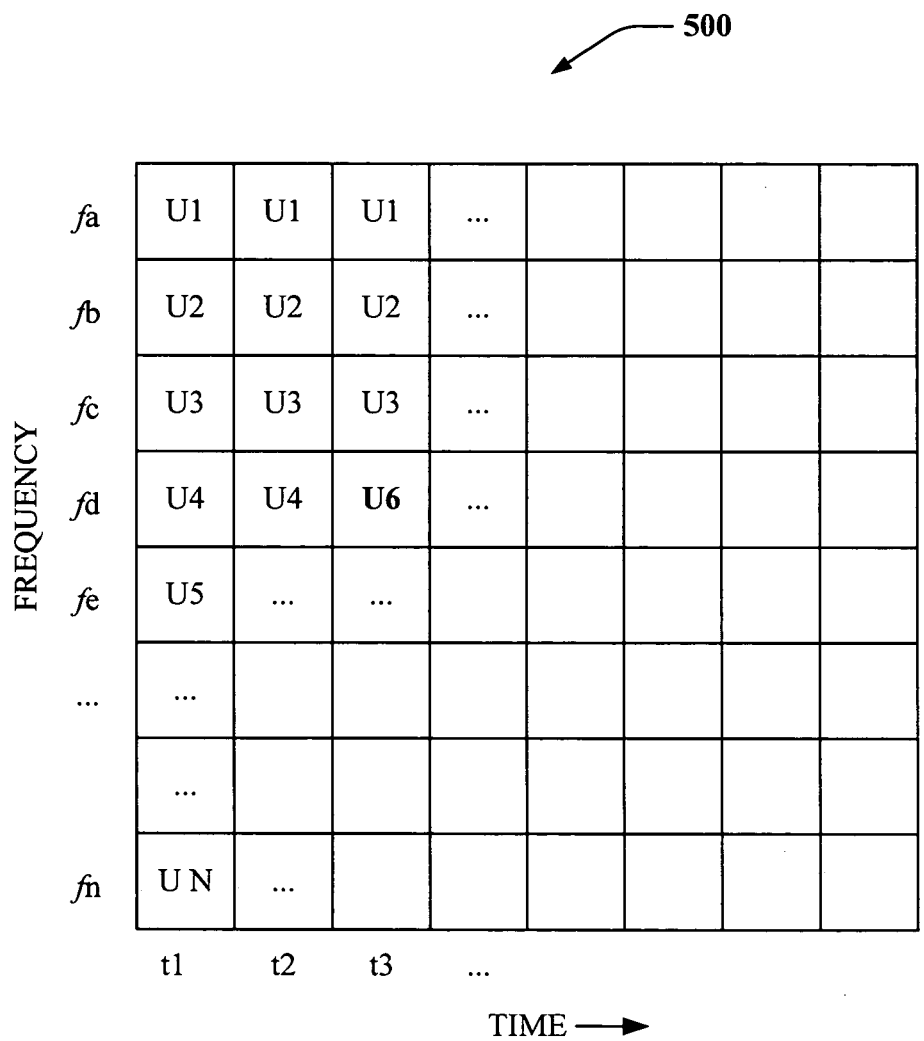
FIG. 5 is an illustration of a series of persistent, or "sticky" assignments made over time, such as can be employed with regard to various embodiments described herein.

FIG. 5 is an illustration of a series of persistent, or "sticky" assignments 500 made over time, such as can be employed with regard to various embodiments described herein. For example, a first set of assignments can be transmitted to users 1-N during a first time frame, and such assignments can persist until one or more subsequent assignments are transmitted to one or more individual users. Thus, the first set of N assignments can suffice to provide system resource assignments to all users until a change in such assignments is desired and/or necessary (e.g., due to user needs, bandwidth availability, . . . ). A subsequent user such as U6 can be assigned frequency fd should such frequency become available, as illustrated at t3. In this manner, fewer assignment messages need be transmitted over a network than when employing non-sticky assignments.

Additionally, available system resources can be assigned to any user 1-N should the user require additional resources. For instance, it can be determined that U5 requires additional frequency availability at some time during communication over a network, in addition to frequency fe. A subsequent assignment message can be transmitted to U5 to indicate that frequencies fe and ff are assigned U5. Moreover, in connection with the various embodiments detailed herein, such additional assignment message can be a supplemental assignment to mitigate consumption of network resources when reassigning frequencies to U5.

Further, a supplemental assignment may function as decremental assignment. For example, with respect to U5, sometime after being assigned frequencies fe and ff, it may be decided to remove a resource. As such, a supplemental assignment identifying frequency ff. if U5 would interpret such a message as a de-assignment of frequency fe, and would cease utilizing or expecting communication on frequency fe.

Figure 6:
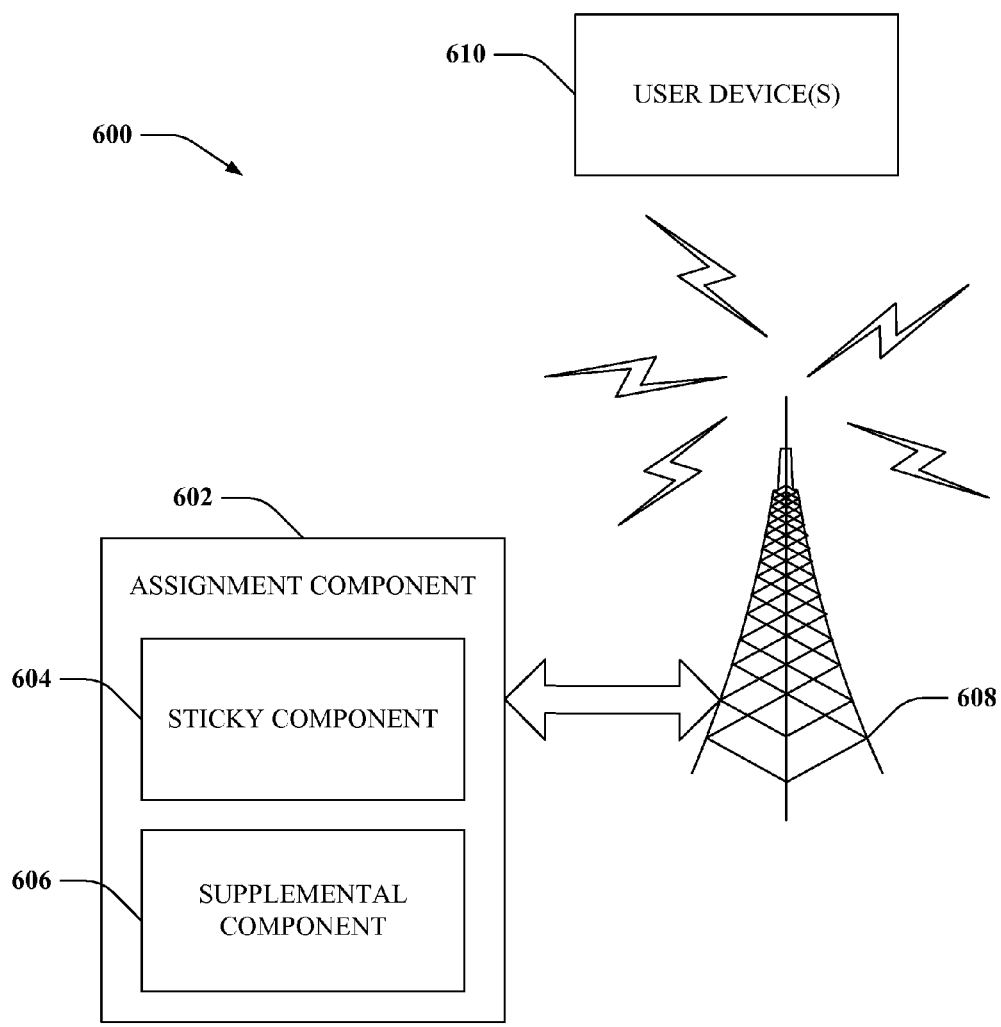
FIG. 6 is an illustration of a system that facilitates employing supplemental assignments to allocate system resources in a manner that reduces system overhead and/or transmission requirements by reducing signal size.

FIG. 6 is an illustration of a system 600 that facilitates employing supplemental assignments to allocate system resources in a manner that reduces system overhead and/or transmission requirements by reducing signal size. System 600 can comprise an assignment component 602 that controls system resource (e.g., channel, frequency, time slot, code slot, . . . ) allocation. Assignment component 602 comprises a sticky component 604 that generates sticky assignments that can be persisted in time until subsequent assignment information is received by a user (e.g., device). Assignment component 602 additionally comprises a supplemental component 606 that generates supplemental assignments to apportion system resources according to user needs as they change. Additionally, supplemental component 606 may be utilized to de-assign resources already assigned to one more user devices 610. For example, a supplemental assignment may identify one resource from which the other resources that are de-assigned are inferred, based upon a pre-determined algorithm, or explicitly identify the remaining or de-assigned resources.

According to an example, user device 610 can be initially assigned a subset of available resources, such as {1, 3, 4, 6: 0}. User device 610 can then require additional resources and it can be determined that a resource block or channel, 2, is available. According to an embodiment, a supplemental assignment [2, 1: 1] can be generated and transmitted to the user to add resources beginning with block 2 and having a length of 1 (e.g., channel 2). In this manner, system 600 need not retransmit a bulky complete assignment message (e.g., {1, 2, 3, 4, 6: 0}).

According to another example, a user can be assigned resources 1-4 by assignment component 602 through an assignment such as [1, 4: 0] (e.g., using a block index array, contiguous assignment, . . . ) or the like. Upon an increase in user resource requirements, additional resources can be assigned to the user through a supplemental assignment message. A conventional approach might resubmit a completely new assignment message such as [1, 5: 0] to add resource block 5 to the list of assigned resources for the user. Alternatively, a supplemental assignment can be generated by the supplemental component, such as [5, 1: 1]. However, resource block 5 must be available for the conventional system to be able to employ the reduced message format of the contiguous assignment for resources 1-5, as denoted herein by hard brackets (e.g., "[ ]"). In the event that resource block 5 is subject to a sticky assignment to another user (e.g., unavailable) system 600 can permit supplemental assignment of resources at reduced overhead cost even when resources are not contiguous. Thus, where non-contiguous resources are available, a conventional system would require an expensive new assignment message such as {1, 2, 3, 4, 6: 0} be generated and transmitted to the user to assign resources 1, 2, 3, 4, and 6. In contrast, supplemental component 606 can generate a supplemental assignment message such as [6, 1: 1], which indicates that the user's assigned resources are to be augmented by a resource allocation beginning with resource 6 and having a vector length of 1. The supplemental resource assignment can then be transmitted by one or more base stations 608 to the user device 610.

According to yet another example, a user who is in an initial stage of a communication event can require a number of system resource blocks. For instance blocks 3, 4, 7, and 8 can be determined to be available by assignment component 602. In such a case, two simple messages can be simultaneously generated and/or transmitted to assign the channels to the user. For example, the messages can be represented as [3, 2: 0] and [7, 2: 1]. Thus, sticky component 604 can generate an initial assignment message and supplemental component 606 can generate a supplemental assignment that can be simultaneously transmitted to the user to assign non-contiguous channels 3, 4, 7, and 8 to the user at reduced cost to system 600. It will be appreciated that the systems and/or methods detailed herein according to various embodiments can be employed in conjunction with systems that employ non-sticky assignments as well sticky assignments.

Figure 7:
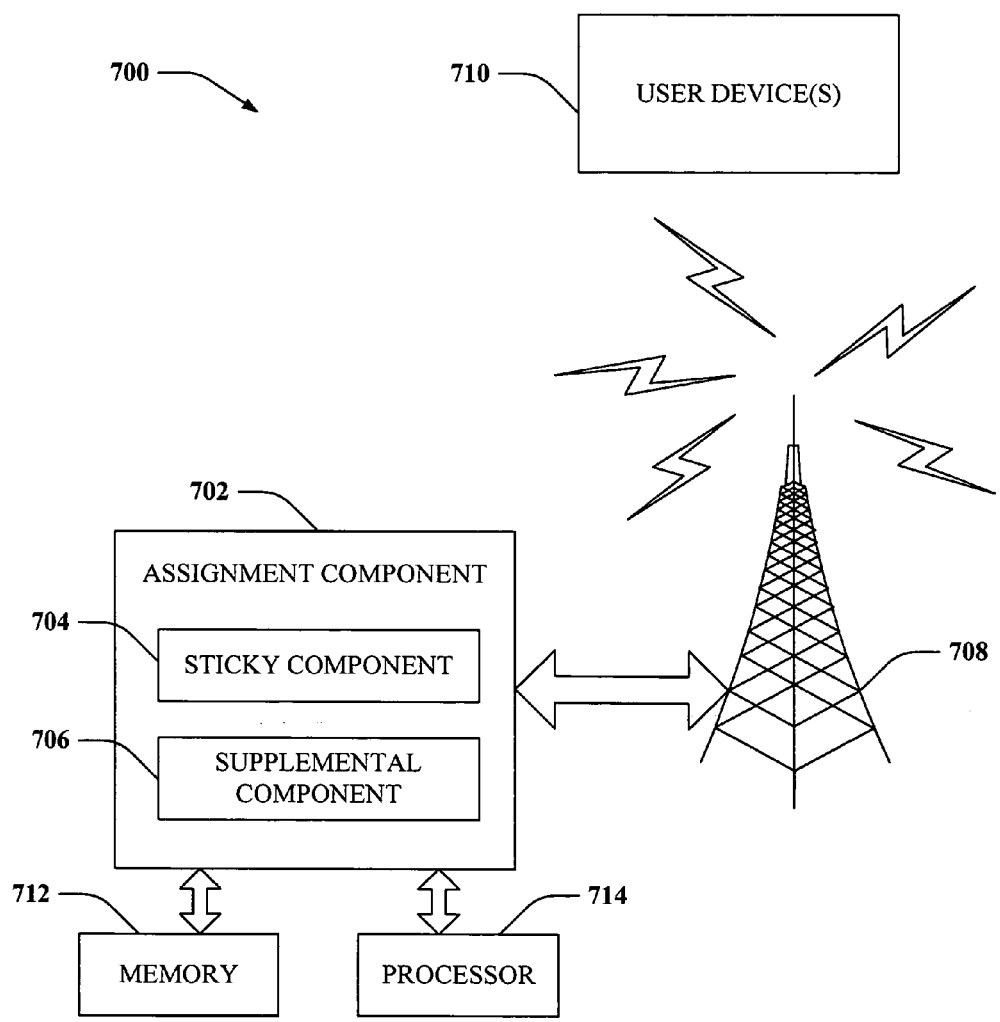
FIG. 7 illustrates a system that facilitates providing supplemental resource assignments to users of a communication network in order to reduce assignment signal overhead cost.

FIG. 7 illustrates a system 700 that facilitates providing supplemental resource assignments to users of a communication network in order to reduce assignment signal overhead cost. System 700 comprises an assignment component 702 that can generate resource assignments for transmission through one or more base stations 708 to one or more network user devices 710. Assignment component 702 comprises a sticky component 704 that can selectively generate sticky (e.g., persistent) assignments for users, wherein such assignments are maintained until a subsequent non-supplemental assignment signal resets the user's resource assignments. Assignment component 702 can generate non-sticky assignments if desired, while the use of sticky assignments can facilitate reducing system overhead by mitigating the number of assignment messages required to allocate resources to users of the network. Once assignments have been assigned to users of the network by assignment component 702 and/or sticky component 704, a supplemental component 706 can generate supplemental assignments as need to allocate additional resources to one or more users. Additionally, supplemental component 706 may be utilized to de-assign resources already assigned to one more user devices 710. For example, a supplemental assignment may identify one resource from which the other resources that are de-assigned are inferred, based upon a pre-determined algorithm, or explicitly identify the remaining or de-assigned resources.

System 700 can additionally comprise memory 712 that is operatively coupled to assignment component 702 and that stores information related to user devices 710, system resources, assignments thereof, and any other suitable information related to providing dynamic allocation of system resources (e.g., channels, frequencies, time slots, code slots, . . . ) to one or more users. A processor 714 can be operatively connected to assignment component 702 (and/or memory 712) to facilitate analysis of information related to generating resource assignments and the like. It is to be appreciated that processor 714 can be a processor dedicated to analyzing and/or generating information received by assignment component 702, a processor that controls one or more components of system 700, and/or a processor that both analyzes and generates information received by assignment component 702 and controls one or more components of system 700.

Figure 8:
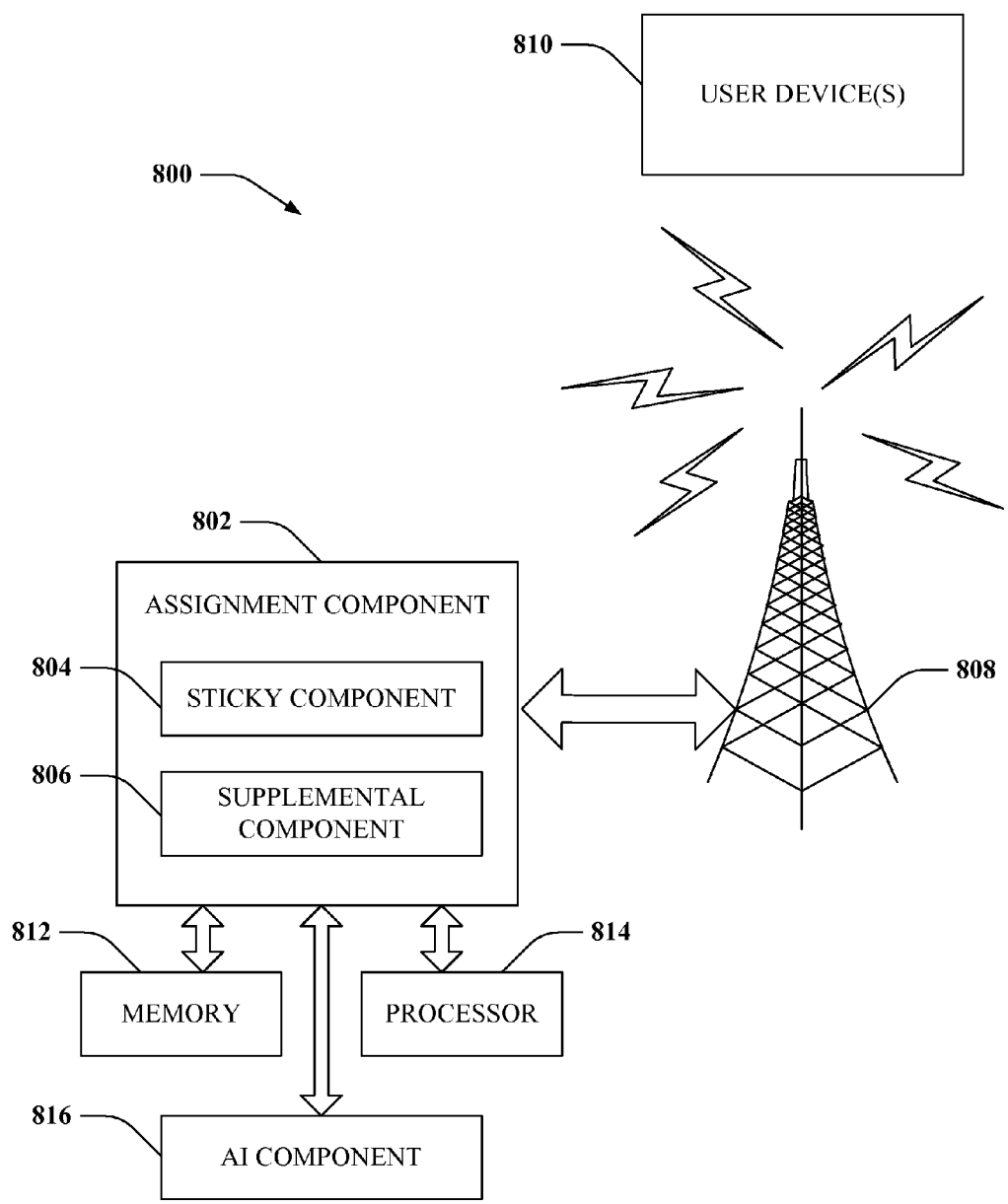
FIG. 8 is an illustration of a system that facilitates generating supplemental assignments to assign system resources to users of a communication network while mitigating resource allocation costs.

Memory 712 can additionally store protocols associated with generating supplemental and/or non-supplemental assignments, etc., such that system 700 can employ stored protocols and/or algorithms to achieve supplemental assignment of system resources as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory FIG. 8 is an illustration of a system 800 that facilitates generating supplemental assignments to assign system resources to users of a communication network while mitigating resource allocation costs. System 800 comprises an assignment component 802 that generates resource assignment signals for transmission through one or more base stations 808 to one or more network user devices 810. Such assignments can by non-sticky (e.g., generated during each time frame). The assignment component comprises a sticky component 804 that generates non- supplemental sticky, or persistent, assignments for devices 810, where such resource assignments are persisted for the user's device 810 until a subsequent non-supplemental assignment message is transmitted to the particular user. By transmitting persistent assignments, sticky component 804 can facilitate reducing a number of assignment messages that need to be sent to users of a network. In order to further reduce transmission costs and assignment message size, assignment component 802 can comprise a supplemental component 806 that generates supplemental assignment messages as described with regard to the preceding figures. Additionally, supplemental component 806 may be utilized to de-assign resources already assigned to one more user devices 810. For example, a supplemental assignment may identify one resource from which the other resources that are de-assigned are inferred, based upon a pre-determined algorithm, or explicitly identify the remaining or de-assigned resources.

Such supplemental assignment messages can comprise a designator bit that informs a receiving device 810 that the message is indeed supplemental and should augment, or de-assign depending on the identified resources, existing resource assignments for the device 810 rather than just replacing such existing assignments. For instance, a designator bit can be appended to an assignment message by assignment component 802, such that a message in which the designator bit value is "0" can indicate that the assignment message is a standard sticky assignment such that assignments comprised thereby should replace existing assignments. Additionally, if the designator bit has a value of "1," such can indicated that the assignment message is a supplemental assignment message and assignments therein should be added to existing resource assignments. As will be appreciated by one skilled in the art, the designator bit can be designed to provide an active low indication of supplemental/non-supplemental status, whereby a designator bit of "1" (e.g., high) can indicate non-supplemental status while a zero value can indicate supplemental status, as desired with regard to system design goals and the like.

System 800 can additionally comprises a memory 812 and a processor 814 as detailed above with regard to FIG. 7. Moreover, an AI component 816 can be operatively associated with assignment component 802 and can make inferences regarding resource allocation in view of overhead cost considerations, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
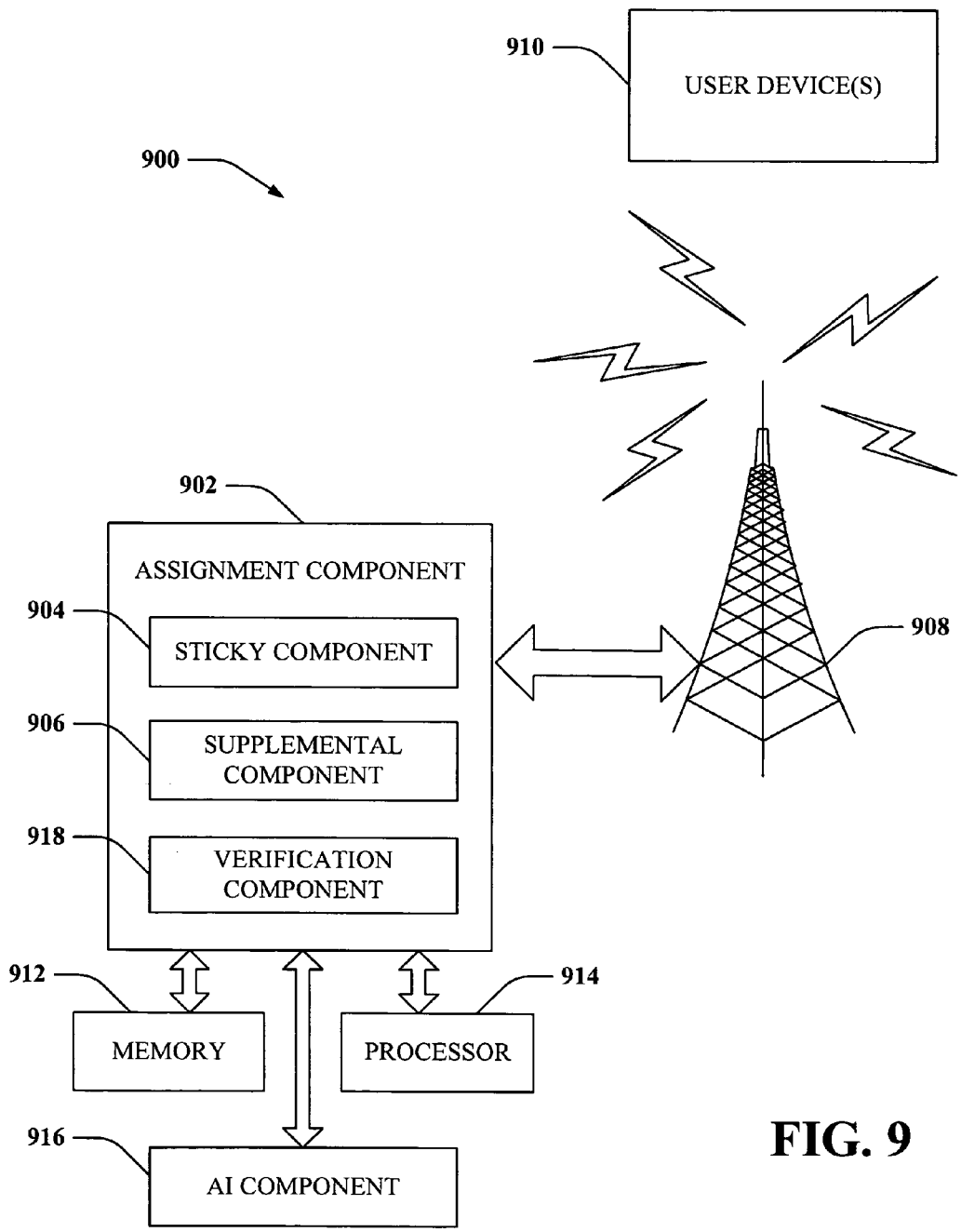
FIG. 9 illustrates a system that facilitates assigning system resources to a user at minimal overhead cost.

FIG. 9 illustrates a system 900 that facilitates assigning system resources to a user at minimal overhead cost. System 900 comprises an assignment component 902 that can assign resources, such as frequencies, channels, transmission time slots, etc., to one or more user devices 910 by way of one or more base stations 908 in a communications network. Assignment component 902 can comprise a sticky component 904 that provides non-supplemental assignments and a supplemental component 906 that can generate supplemental assignments as described herein with regard to preceding figures. Assignment component 902 is additionally operatively coupled to each of a memory 912, a processor 914, and an AI component 916, each of which can in turn be operatively coupled to the other. Additionally, supplemental component 906 may be utilized to de-assign resources already assigned to one more user devices 910. For example, a supplemental assignment may identify one resource from which the other resources that are de-assigned are inferred, based upon a pre-determined algorithm, or explicitly identify the remaining or de-assigned resources.

The assignment component 902 can additionally comprise a verification component 918 that receives validation data from one or more user devices 910 via one or more base stations 908. According to this scenario, user devices 910 can comprise transceiving functionality in order to transmit validation information back to assignment component 902. Such validation data can be, for instance, a verification message indicating successful packet or sequence decode over a reverse link, an acknowledgement (ACK) of successful assignment receipt and/or decode over a forward link, and the like. Such a verification message can be generated by a verification component (not shown) associated with the user device(s), etc., which can recognize a successful resource assignment, receipt of a message conveying assignment information and the like. In this manner, system 900 can validate an assignment to a user prior to supplementing the assignment with a signal generated by supplemental component 906.

Figure 10:
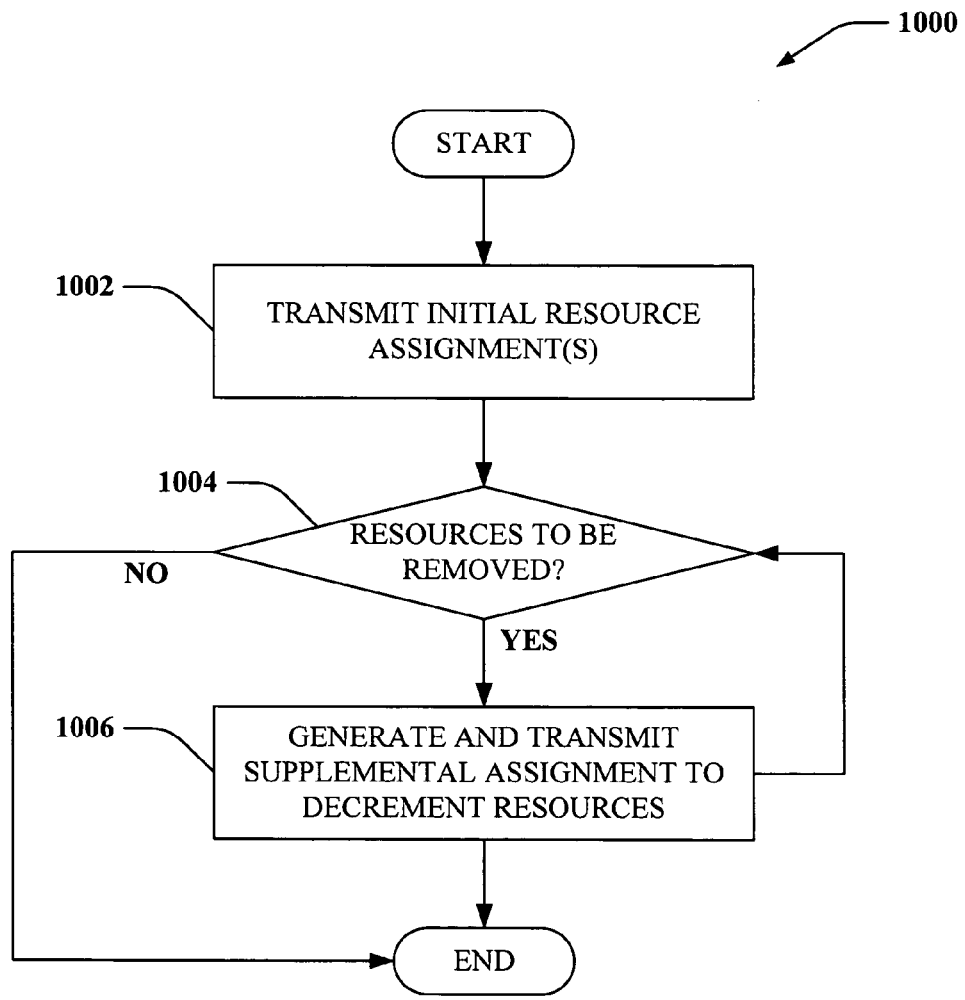
FIG. 10 illustrates a methodology for generating and providing supplemental system resource assignments to users of a wireless network.
Figure 11:
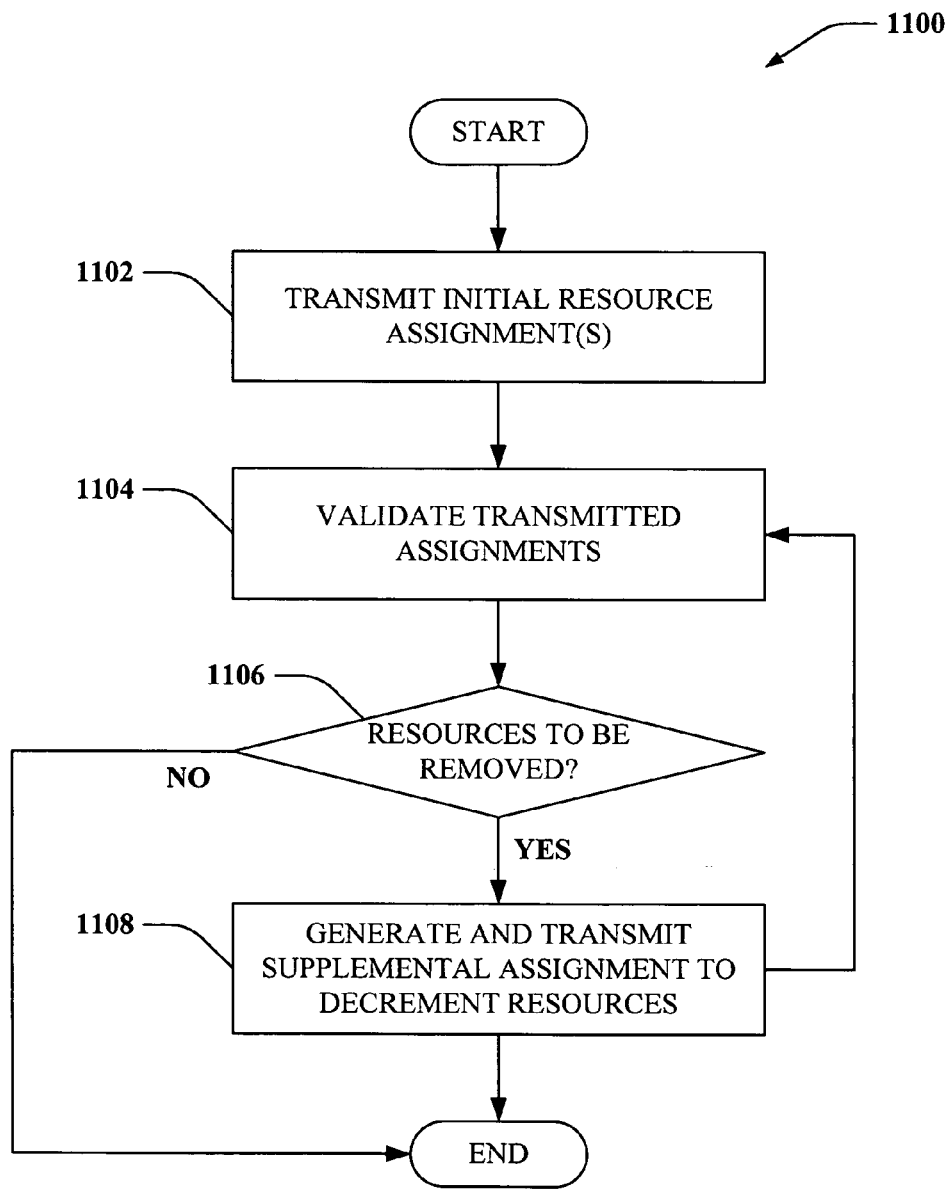
FIG. 11 illustrates a methodology for generating and transmitting supplemental assignments to a user in a wireless network environment is illustrated.
Figure 12:
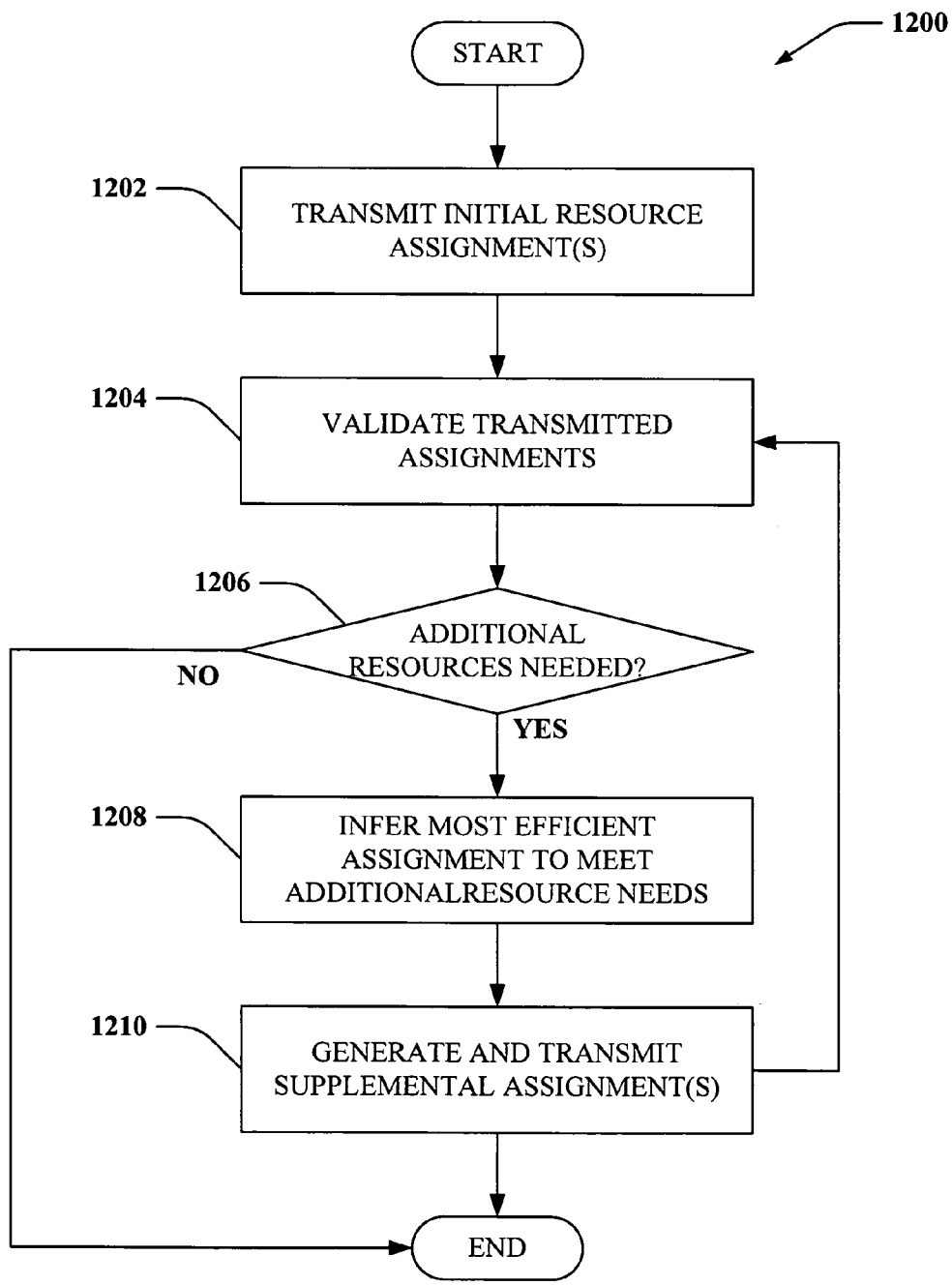
FIG. 12 is an illustration of a methodology for providing supplemental resource assignments to devices communication over a wireless network.

Referring to FIGS. 10-12, methodologies relating to generating supplemental system resource assignments are illustrated. For example, methodologies can relate to supplemental assignments in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Referring now solely to FIG. 10, a methodology 1000 for generating and providing supplemental system resource assignments to users of a wireless network. The methodology 1000 can permit the use of efficient channel assignment techniques while avoiding primary limitations of such techniques. Through utilization of supplemental resource assignments, a network can closely match a user's resource assignment to the user's needs and enable the network to optimize usage of system resources, even when subsets of assignable resources are restricted by assignment message format. Additionally, by using supplemental assignment messages to increase or decrease assigned resources, the method 1000 can reduce a number of assignment, and de-assignment, messages required to be communicated to achieve a desired resource allocation.

In order to facilitate utilization of supplemental resource assignments, at 1002, initial resource assignments can be generated and transmitted to one or more users' devices throughout the network. For example, assignments can be non-supplemental assignments of resources such as network frequencies, channels, time slots, etc. Additionally such assignments can be sticky assignments in order to facilitate minimizing a number of total assignments that need to be transmitted over the network over time. Once assignments have been transmitted to users of the network, the network can be monitored to determine whether any users require additional resources, or that resources should be reduced, at 1004. Upon a determination that a user requires resource assignment in addition to the user's existing assignments, or that a user's resources need to be reduced, a supplemental assignment can be generated for the user and transmitted to the user's communications device at 1006. Once the supplemental assignment has been transmitted, the method can revert to 1004 for continued monitoring and/or determination of whether additional resources are required by any users, or existing resources should be de-assigned, which can then trigger generation and transmission of further supplemental resource assignments at 1006.

621 For example, the user can initially be assigned resource blocks 1-5 at 1002. If the user requires additional resources, the determination at 1004 can detect such requirement, and at 1006 such resource assignments are generated in a manner that facilitates reducing system overhead with regard to assignment message size, etc. For example, generation of a supplemental assignment can comprise first determining which resources (and/or resource blocks) are available. Upon such assessment, a supplemental assignment can be generated and can be flagged as such to permit the network and/or receiving device to identify the assignment as supplemental. For instance, if it is determined that resource blocks 11 and 12 are available for assignment to the user, then a supplemental message assigning only blocks 11 and 12 can be generated at 1106. The message can be suitable tagged as "supplemental" to ensure that blocks 11 and 12 are added to assigned blocks 1-5 rather than replace such blocks. In the case of a decremental assignment, a determination 1004 can detect a need to reduce resources and then at 1006 such resource de-assignments may be transmitted as a supplemental assignment.

Tagging an assignment message can be facilitated by appending a designator bit to all assignment messages, whether supplemental or non-supplemental, such that the value of the designator bit informs the recipient device and/or the network that the subject assignment should either replace an existing assignment or should augment it. For example, a designator bit has a value of "0" can indicate that the assignment is non-supplemental, while a value of "1" can indicate that the assignment is supplemental. It will be appreciated that the values of the designator bit can be inverted, so long as such values are consistently applied to denote each of the two possible statuses of an assignment message (e.g., supplemental and non-supplemental). Moreover, designation of an assignment as such is not limited to employment of a designator bit, but rather can be effected using any suitable indicator(s) (e.g., a bit sequence, a message prefix, a flag in a message header, . . . ).

Turning now to FIG. 11, a methodology 1100 for generating and transmitting supplemental assignments to a user in a wireless network environment is illustrated. At 1102, initial resource allocations can be transmitted to users of the network. For instance, non-supplemental assignment messages can be generated and transmitted to individual user devices, which need not be aware of assignments to other devices. At 1104, mobile devices can provide a validation signal to the network to verify successful decoding and acceptance of the assigned resource message. At 1106, a determination can be made regarding whether one or more mobile devices require additional system resources, or if resources should be de-assigned from the user. If the determination is that no additional resources are required, or should be de-assigned, then the method can terminate.

If, at 1106, it is determined that additional resources are required, or should be de-assigned, by the device, then at 1108 such resources can be provided with a supplemental assignment. For example a mobile device such as a cellular phone can receive an initial resource allocation at 1102 that permits voice transmission. The determination at 1106 can indicate that a user of the mobile device is attempting to download a web page, transmit a digital photograph or video clip, etc., which can require additional transmission bandwidth. Thus, at 1108, a supplemental resource assignment can be generated to meet bandwidth needs of the device, and can be transmitted to the device to meet device needs.

According to a related example, if the device initially verified receipt and/or acceptance of resource blocks 100-104 and requires an additional four resource blocks, then a supplemental assignment message such as [X, 4: 1] can be transmitted to the device, where X is an integer representing a first resource block in a first contiguous set of available resource blocks. Because all previous resource assignments have been validated at 1104, a complete list of available resources can be known for supplemental assignment generation and transmission at 1108. After supplemental assignment transmission at 1108, the method can revert to 1104 for another iteration of assignment verification, which can include verification of supplemental assignments, prior to network monitoring to determine whether subsequent supplemental assignments are necessary for one or more users at 1106. It will be appreciated that supplemental resource assignment messages need not comprise contiguous resource assignments, but that such assignments can be expressed in a manner (e.g., a block index array, . . . ) that facilitates generation of a convenient and cost-effective assignment message. For example, such messages can be expressed with two indices and a designator bit.

Referring now to FIG. 12, a methodology 1200 for providing supplemental resource assignments to devices communication over a wireless network. At 1202, initial resource allocations can be made and assignments can be transmitted to one or more devices using the network. For instance, a first user can be assigned resource blocks by way of a non-supplemental sticky assignment such as {1, 2, 3, 6, 7, 10: 0}, while a second user can be assigned resource blocks according to a second non-supplemental assignment message such as {4, 5, 8: 0}, where ":0" represents a designator bit identifying the assignment message as non-supplemental. Users need not be aware (e.g., need not view) other users' assignment messages. At 1204, assignment messages can be validated by recipient mobile devices. For instance, a simple acknowledgement message can be transmitted to the network verifying receipt, successful decoding, and /or acceptance of the assignment message. In this manner, the network can be apprised of precisely which resources remain available for supplemental assignment, etc. At 1206, a determination can be made regarding which, if any, devices require additional system resources or should have resources removed. If no additional resources are required or need to be removed, the method can terminate. If additional resources are required, or need to be removed, by one or more devices, then the message can proceed to 1208. For example, the first user described above can require an additional three resource blocks for an operation over the network. A most efficient supplemental message format can be inferred at 1208 to provide supplemental assignments to the first user at a lowest overhead cost (e.g., based on cost-benefit analysis, optimization techniques, . . . ).

For example, if all initial resource block assignments have been validated as of 1204, then the next three available resource blocks can be known to be blocks 7, 9, and 11. A supplemental assignment message comprising assignments of these blocks can be represented as {7, 9, 11: 1} and can be transmitted to the first user at 1210. However, a more efficient message (e.g., shorter message) can be [9, 4: 1], which transmits supplemental resource assignments of four contiguous resource blocks beginning with block 9. Since block 10 is already assigned to the first user's device, there is no conflict, and new blocks 9, 11, and 12 will additionally be assigned to the first user to meet the user's resource needs. Inferences can be made at 1208 (e.g., using artificial intelligence techniques, machine-learning techniques, . . . ) that can facilitate a determination that the more efficient (e.g., cheaper) message is desirable, and such can be selected for generation and transmission at 1210. In the case of a decremental assignment, a determination 12064 can detect a need to reduce resources and then at 1208 such resource de-assignments may be transmitted as a supplemental assignment.

According to a similar example, it can be determined at 1204 that a second user failed to verify receipt/acceptance of its initial assignment message. So long as such resource blocks are still available (e.g., have not been assigned to a third or subsequent user device), they can be assigned to the first user in a supplemental assignment message such as {4, 5, 8: 1}. Only the first user need be aware of the supplemental assignment, as supplemental assignments can be transparent to all users but the recipient in order to still further reduce network overhead, processing time, etc. Additionally, at 1208, it can be inferred that the supplemental assignment message can be reduced to a contiguous assignment such as [4, 5: 1], where "4" represents a first resource block, "5" represents a contiguous series of blocks that begins with "4", and ":1" designates the message as supplemental. Such is permissible because it is known that blocks 6 and 7 are already assigned to the first user, such that the more efficient contiguous supplemental assignment does not conflict with the first user's existing assignments. In this manner, inferences made at 1208 can facilitate generation and transmission of a supplemental assignment message at 1210 that is most cost-efficient with respect to overhead requirements and/or assignment transmission message size.

Figure 13:
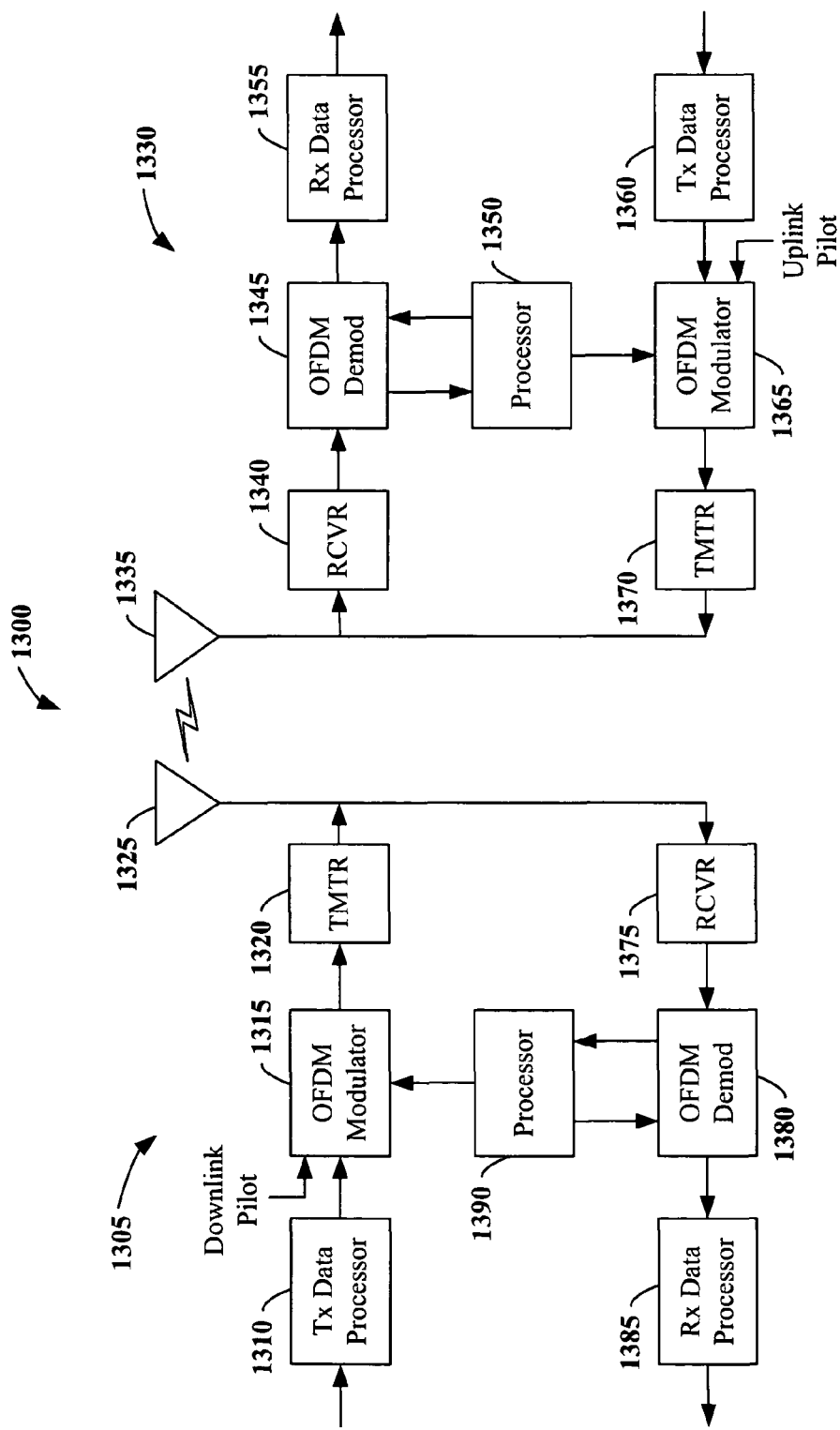
FIG. 13 is an illustration of a wireless network environment that can be employed in conjunction with the various systems and methods described herein.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 6-9) and/or methods (FIGS. 10-12) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). An OFDM modulator 1315 receives and processes the data symbols and pilot symbols and provides a stream of OFDM symbols. An OFDM modulator 1315 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1315 can transform each set of N transmit symbols to the time domain using an N-point IFFT to obtain a "transformed" symbol that contains N time-domain chips. OFDM modulator 1315 typically repeats a portion of each transformed symbol to obtain a corresponding OFDM symbol. The repeated portion is known as a cyclic prefix and is used to combat delay spread in the wireless channel.

A transmitter unit (TMTR) 1320 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. An OFDM demodulator 1345 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1350 for channel estimation. OFDM demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by OFDM demodulator 1345 and RX data processor 1355 is complementary to the processing by OFDM modulator 1315 and TX data processor 1310, respectively, at access point 1305.

On the uplink, a TX data processor 1360 processes traffic data and provides data symbols. An OFDM modulator 1365 receives and multiplexes the data symbols with pilot symbols, performs OFDM modulation, and provides a stream of OFDM symbols. The pilot symbols may be transmitted on subbands that have been assigned to terminal 1330 for pilot transmission, where the number of pilot subbands for the uplink may be the same or different from the number of pilot subbands for the downlink. A transmitter unit 1370 then receives and processes the stream of OFDM symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. An OFDM demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. For example, processor 1350 may be configured to perform the functions described with respect to FIGS. 14 and 15. Respective processors 1390 and 1350 can be associated with memory units (not shown) that store program codes and data. Processors 1390 and 1350 can also perform computations to derive frequency and impulse response estimates for the uplink and downlink, respectively.

Figure 14:
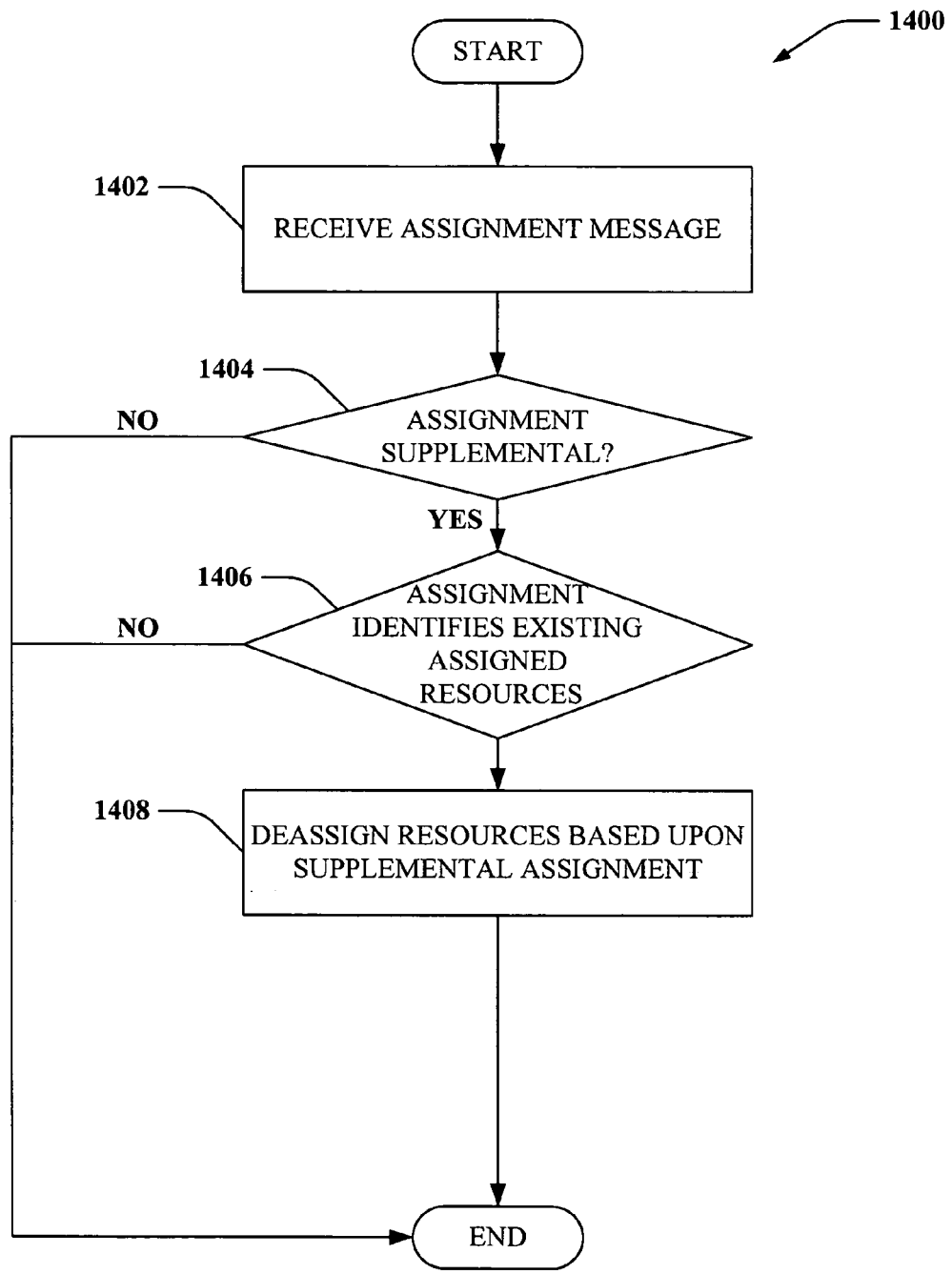
FIG. 14 is an illustration of a methodology for processing supplemental resource assignments to determine whether to de-assign resources at a wireless communication apparatus.

FIG. 14 is an illustration of a methodology 1400 for processing supplemental resource assignments to determine whether to de-assign resources at a wireless communication apparatus. The methodology 1400 can permit the use of efficient channel assignment techniques while avoiding primary limitations of such techniques. Through utilization of supplemental resource assignments, a network can closely match a user's resource assignment to the user's needs and enable the network to optimize usage of system resources, even when subsets of assignable resources are restricted by assignment message format. Additionally, by using supplemental assignment messages to increase or decrease assigned resources, the method 1000 can reduce a number of assignment, and de-assignment, messages required to be communicated to achieve a desired resource allocation.

In order to facilitate utilization of supplemental resource assignments a user determines that an assignment message has been received, block 1402. Then, a determination is made as to whether the assignment message is standard assignment message or supplemental assignment message, block 1404. In certain aspects, this determination may be made by determining whether the supplemental flag or bit is set in the assignment message.

If the assignment is not supplemental no further processing with respect to resource de-assignment need occur. If the assignment is a supplemental assignment, then a determination is made as to whether the supplemental assignment is used to de-assign resources, block 1406. This may be done by determining whether any of the resources identified by the supplemental assignment are already assigned to the user. If this is the case, the supplemental assignment may be assumed to be a de-assignment of some resources.

If the supplemental assignment is not a de-assignment of resources no further processing with respect to resource de-assignment need occur. If the assignment is a supplemental assignment, then the appropriate resources are de-assigned, block 1408. This may be determined by the explicit resources in the supplemental assignment, from those resources that overlap the current assignment,. Alternatively, the determination may be made by all resources that have a logical order, e.g. channel ID or channel tree node ID, that is greater, or lesser, than the logical order of the resource that is identified in the supplemental assignment. Further, a de-assignment may be specified by providing first and second resources and all resources of a logical order between them are to remain, or be removed, after the de-assignment.

Figure 15:
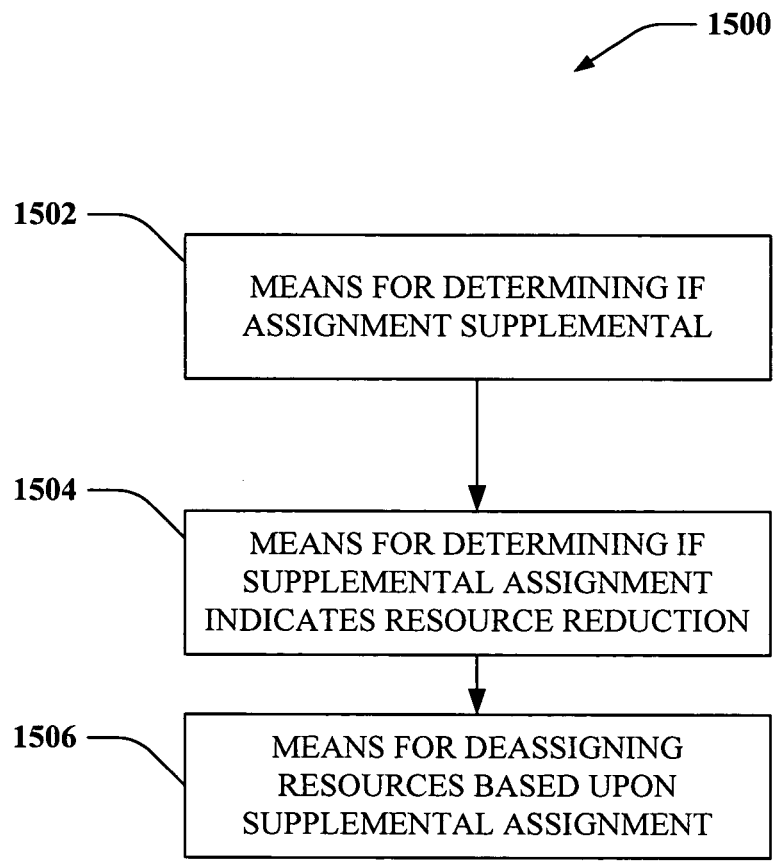
FIG. 15 is an illustration of an apparatus for processing supplemental resource assignments to determine whether to de-assign resources at a wireless communication apparatus.

FIG. 15 is an illustration of an apparatus 1500 for processing supplemental resource assignments to determine whether to de-assign resources at a wireless communication apparatus. Means 1502 for determining whether an assignment message received is standard assignment message or supplemental assignment message, is in communication with means 1504 for determining whether the supplemental assignment is used to de-assign resources. This may be done by determining whether any of the resources identified by the supplemental assignment are already assigned to the user. If this is the case, the supplemental assignment may be assumed to be a de-assignment of some resources.

Means 1504 is in communication with means 1506 for de-assigning the appropriate resources. This may be determined by the explicit resources in the supplemental assignment, from those resources that overlap the current assignment,. Alternatively, the determination may be made by all resources that have a logical order, e.g. channel ID or channel tree node ID, that is greater, or lesser, than the logical order of the resource that is identified in the supplemental assignment. Further, a de-assignment may be specified by providing first and second resources and all resources of a logical order between them are to remain, or be removed, after the de-assignment.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of dynamically allocating system resources, comprising:
    transmitting a persistent non-supplemental assignment to at least one mobile device connected to a wireless network to assign an initial set of resources to the at least one mobile device;
    determining whether the at least one mobile device requires resource de-allocation;
    generating a supplemental assignment that de-assigns the resources and is indicated as a supplemental assignment message; and
    transmitting the supplemental assignment to the at least one mobile device.

2. The method of claim 1, generating comprises identifying at least one resource that is indicative of multiple resources to remain as part of the persistent non-supplemental assignment after a de-assignment.

3. The method of claim 1, generating comprises explicitly identifying at least one resource to remain as part of the persistent non-supplemental assignment after a de-assignment.

4. The method of claim 1, generating comprises explicitly identifying at least one resource to remove as part of a de-assignment.

5. The method of claim 1, generating comprises setting a flag in the supplemental assignment message to identify the message as a supplemental assignment.

6. The method of claim 5, wherein the flag consists of one bit.

7. A system that facilitates supplementing resource assignments for mobile devices, comprising:
    an assignment component that generates non-supplemental resource assignments for a plurality of respective mobile devices, wherein the non-supplemental resource assignments are persisted until a subsequent non-supplemental resource assignment is received by the mobile device to which the assignment corresponds;
    a supplemental component that receives information related to increased or decreased resource requirements of at least one of the plurality of mobile devices and generates a supplemental assignment to allocate additional resources or de-allocate existing resources to satisfy the resource requirements of the at least one mobile device; and
    a transceiver that transmits supplemental assignment messages to the plurality of mobile devices.

8. The system of claim 7, the supplemental component identifies one resource that is indicative of multiple resources to remain as part of the non-supplemental resource assignment after a de-assignment.

9. The system of claim 7, the supplemental component explicitly identifies multiple resources to remain as part of the non-supplemental resource assignment after a de-assignment.

10. The system of claim 7, the supplemental component explicitly identifies multiple resources to remove as part of a de-assignment.

11. The system of claim 7, the supplemental component sets a flag in the supplemental assignment message to identify the message as a supplemental assignment.

12. The system of claim 11, wherein the flag consists of one bit.

13. An apparatus comprising:
    means for generating a persistent initial resource assignment that assigns resources to at least one mobile device;
    means for determining whether the at least one mobile device requires resource de-allocation;
    means for generating a supplemental assignment that de-assigns the resources and is indicated as a supplemental assignment message; and
    a transmitter that transmits the supplemental assignment to the at least one mobile device.

14. The apparatus of claim 13, the means for generating comprises means for identifying at least one resource that is indicative of multiple resources to remain as part of the persistent initial resource assignment after a de-assignment.

15. A mobile device, comprising:
    a processor configured to identify whether an assignment message is at least one of a persistent non-supplemental assignment that assigns resources to at least one mobile device, or a supplemental assignment, and if it is a supplemental assignment to determine whether the supplemental assignment is intended to de-assign resources assigned by a prior persistent non-supplemental assignment; and a memory coupled to the processor.

16. The mobile device of claim 15, the processor is configured to determine resources being de-assigned by the supplemental assignment.

17. The mobile device of claim 15, the processor is configured to determine multiple resources being de-assigned from one resource indicated in the supplemental assignment.

18. The mobile device of claim 15, the processor is configured to determine multiple resources being de-assigned from multiple resources indicated in the supplemental assignment.

19. The mobile device of claim 15, wherein the processor determines whether the assignment is a supplemental assignment based on a flag in the assignment message.

20. The mobile device of claim 19, wherein the flag consists of one bit.

21. A method of processing assignments, comprising:
determining whether a received assignment message is at least one of a persistent non-supplemental assignment that assigns resources to at least one mobile device, or a supplemental assignment;
if the assignment message is a supplemental assignment, then determining whether the supplemental assignment is intended to de-assign resources; and
if the supplemental assignment is a de-assignment, de-assigning resources based upon resources identified in the supplemental assignment.

22. The method of claim 21, de-assigning comprises de-assigning multiple resources based upon one identified resource that is indicative of multiple resources to remain as part of an assignment after the de-assignment.

23. The method of claim 21, de-assigning comprises de-assigning multiple resources based upon multiple identified resources that are indicative of multiple resources to remain as part of an assignment after the de-assignment.

24. The method of claim 21, de-assigning comprises de-assigning multiple resources that are the same as multiple identified resources that are indicative of multiple resources to remain as part of an assignment after the de-assignment.

25. The method of claim 21, determining comprises at least one of determining according to a flag in the assignment message to identify the message as a supplemental assignment, or determining based on an overlap of resources assigned in a previously obtained non-supplemental persistent assignment and the supplemental assignment.

26. The method of claim 25, wherein the flag consists of one bit.

27. An apparatus comprising:
means for determining whether a received assignment message is at least one of a persistent non-supplemental assignment that assigns resources to at least one mobile device, or a supplemental assignment;
means for, if the assignment message is a supplemental assignment, then determining whether the supplemental assignment is intended to de-assign resources; and
means for, if the supplemental assignment is a de-assignment, de-assigning resources based upon resources identified in the assignment message.

28. The apparatus of claim 27, means for de-assigning comprises means for de-assigning multiple resources based upon one identified resource that is indicative of multiple resources to remain as part of an assignment after the de-assignment.

29. The apparatus of claim 27, means for de-assigning comprises means for de-assigning multiple resources based upon multiple identified resources that are indicative of multiple resources to remain as part of an assignment after the de-assignment.

30. The apparatus of claim 27, means for de-assigning comprises means for de-assigning multiple resources that are the same as multiple identified resources that are indicative of multiple resources to remain as part of an assignment after the de-assignment.

31. The apparatus of claim 27, means for determining comprises means for determining based on at least one of a flag in the assignment message to identify the message as a supplemental assignment, or an intersection of resources indicated in a previously obtained non-supplemental persistent assignment and the supplemental assignment.

32. The apparatus of claim 31, wherein the flag consists of one bit.

* * * * *